(12) United States Patent
Horimai

(10) Patent No.: US 6,366,368 B1
(45) Date of Patent: Apr. 2, 2002

(54) METHOD AND APPARATUS FOR FORMING HOLOGRAM

(76) Inventor: Hideyoshi Horimai, Room 301, 2032-2, Ooka, Numazu-shi, Shizuoka 410-0022 (JP)

( * ) Notice: Subject to any disclaimer, the term of this patent is extended or adjusted under 35 U.S.C. 154(b) by 0 days.

(21) Appl. No.: 09/601,624

(22) PCT Filed: Feb. 26, 1999

(86) PCT No.: PCT/JP99/00895

§ 371 Date: Aug. 4, 2000

§ 102(e) Date: Aug. 4, 2000

(87) PCT Pub. No.: WO99/44102

PCT Pub. Date: Sep. 2, 1999

(30) Foreign Application Priority Data

Feb. 27, 1998 (JP) .......................................... 10-047517

(51) Int. Cl.[7] .............................. G03H 1/08; G03H 1/26; G03H 1/30; G11B 7/0065; G06T 17/00

(52) U.S. Cl. ................................ 359/9; 359/3; 359/22; 359/23; 359/25; 359/26; 359/33; 359/35; 369/103

(58) Field of Search .............................. 359/3, 4, 9, 10, 359/22–26, 32, 33, 35; 369/103, 112

(56) References Cited

U.S. PATENT DOCUMENTS

| | | | |
|---|---|---|---|
| 3,716,286 A | * | 2/1973 | St. John et al. ............... 359/3 |
| 5,285,438 A | * | 2/1994 | Marchand et al. .......... 369/103 |
| 6,020,985 A | * | 2/2000 | McLeod et al. .............. 359/22 |
| 6,147,782 A | * | 11/2000 | Daiber et al. .................. 359/1 |

FOREIGN PATENT DOCUMENTS

| | | | | |
|---|---|---|---|---|
| JP | 64-63902 | 3/1989 | | |
| JP | 7-160183 | 6/1995 | | |
| JP | 8-305263 | 11/1996 | | |
| WO | AU-WO97/02563 A | * | 1/1997 | .................. 359/22 |

OTHER PUBLICATIONS

"Recording of high resolution image by Holographic 3–D Printer", Endoh et al., 23rd Conference on Imaging Technology, pp. 317–120, 1992.

"Holoprinter for three–dimensional image hardcopy", Yamaguchi et al., Journal of the Society of Electrophotography of Japan, vol. 22, No. 4, pp. 342–345, 1993.

* cited by examiner

Primary Examiner—Jon Henry
(74) Attorney, Agent, or Firm—Oliff & Berridge, PLC

(57) ABSTRACT

The invention makes it possible to form a hologram for reproducing a three-dimensional image easily free of limitations placed by the size of the three-dimensional image to be reproduced, the size of the hologram and reference light for reproduction. A controller calculates a three-dimensional interference pattern for generating reproduction light associated with a desired three-dimensional image when a recording medium (1) is illuminated with reference light for reproduction, divides the three-dimensional interference pattern into partial interference patterns and calculates reference light and information light for recording for each of the partial interference patterns. A final hologram is formed by illuminating the recording medium (1) with reference light and information light for recording using a head (10) while changing the relative positional relationship between the recording medium (1) and the head (10) by moving the head (10) with a VCM (13) while transporting the recording medium (1).

16 Claims, 19 Drawing Sheets

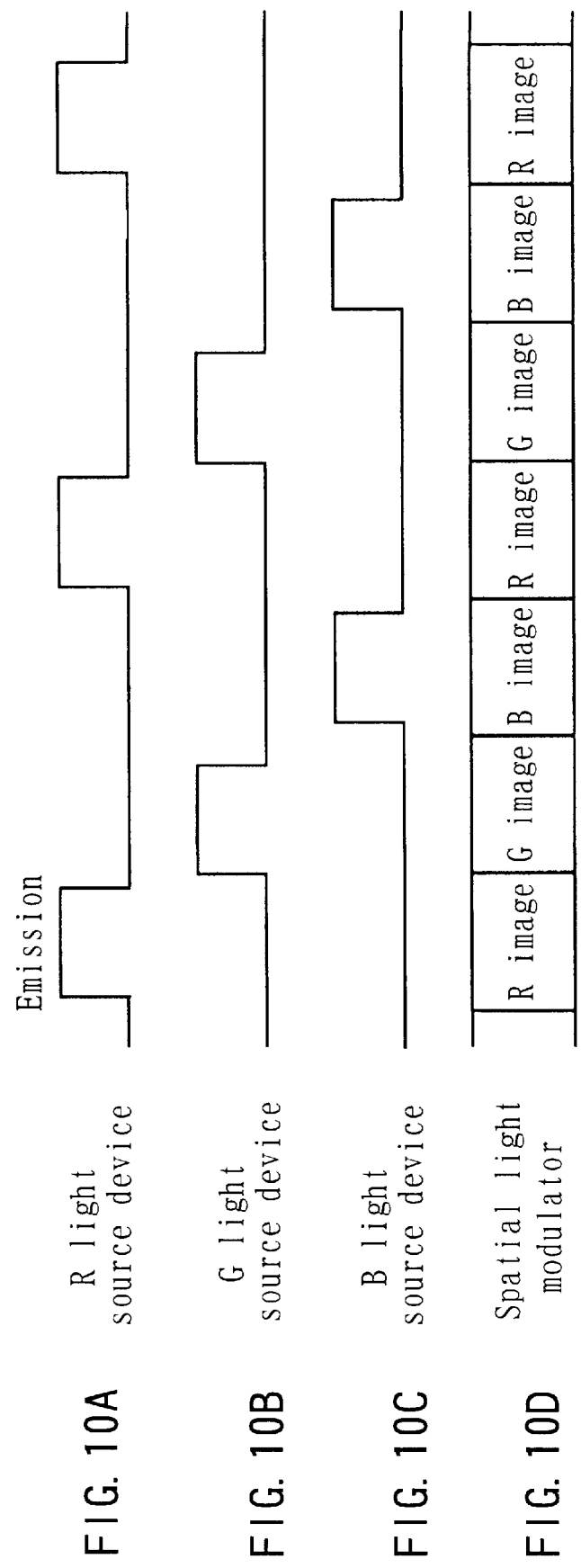
FIG. 10A R light source device
FIG. 10B G light source device
FIG. 10C B light source device
FIG. 10D Spatial light modulator

METHOD AND APPARATUS FOR FORMING HOLOGRAM

TECHNICAL FIELD

The present invention relates to a method and an apparatus for forming holograms for reproducing three-dimensional images.

BACKGROUND ART

Recent advances of computer-related techniques have made it possible to process three-dimensional image information easily. One popular means for outputting three-dimensional image information to be processed by a computer has been simulation of three-dimensional representation on a display. With such simulated three-dimensional representation, an image displayed on a display can be freely moved to allow three-dimensional observation of the displayed image. However, it is difficult to represent three-dimensional image information sufficiently using simulated three-dimensional representation because it is not a real representation of the three-dimensional image.

Means for outputting three-dimensional image information in practical use other than the above-described simulated three-dimensional representation include modeling apparatuses (also referred to as "solid creators") which automatically create a model from three-dimensional image information. However, when three-dimensional image information is transmitted to a remote location such as a foreign country to evaluate it at that remote location using such a modeling apparatus, it is necessary to prepare the modeling apparatus at the remote location and to create a model actually using the modeling apparatus, which indicates that the use of such a modeling apparatus is not necessarily convenient output means in terms of cost and time. Especially, when three-dimensional image information is to be output in a plurality of locations, the method for outputting three-dimensional information using a modeling apparatus is impractical because it results in an enormous cost.

It is therefore desired to provide effective and practical means for outputting three-dimensional image information.

In the advertising and publishing industries, there is a need for creating advertisements or magazine front pages that give stronger impression. This has resulted in a need for simple three-dimensional image representation.

One possible technique for satisfying the above-described needs is to output three-dimensional image information utilizing holography. In general, the output of three-dimensional image information utilizing holography is performed by projecting reference light upon a recording medium in which an interference pattern is recorded as a result of interference between object light carrying image information and reference light, that is, a hologram.

However, the method of forming a hologram as a result of interference between object light and reference light allows only the recording of information of a real object and does not allow the recording of three-dimensional image information to be processed by a computer. Further, this method does not allow recording of information of even a real object if the object is too large. In addition, this method is unsuitable for people called creators who attempt to create images with characters such as titles and various visual effects added thereon. Moreover, it is difficult to form large holograms that can be used for advertisements on the street with this method.

There is a technique in prior art referred to as "computer-synthesized holography" for forming holograms based on three-dimensional image information to be processed by a computer. According to this technique, for example, a computer calculates an interference pattern that should be generated as a result of interference between information light obtained by performing a Fourier transform on information of an object in a space to be three-dimensionally represented and reference light; the pattern is drawn with a normal printer or the like; the drawn pattern is photographed using a camera or the like to reduce it to a size which corresponds to the actual dimensions of the represented object and which is determined by the wavelength of the same; and a hologram is formed by printing the reduced pattern in the form of irregularities and dots.

However, the method for forming a hologram utilizing computer-synthesized holography according to the prior art is inadequate for the purpose of outputting three-dimensional image information to be processed by a computer easily because it involves many steps to be carried out. The method according to the prior art has another problem in that it is difficult to improve diffracting efficiency and the rendering capability of three-dimensional image representation because an interference pattern is recorded on a two-dimensional basis and, therefore, Bragg diffraction can not be effectively utilized.

Holographic printers for forming a hologram capable of representing a three-dimensional image are disclosed in Endoh et al., Recording of high resolution image by Holographic 3-D Printer, the 23rd Conference on Imaging Technology, pp. 317–320, 1992 and Yamaguchi et al., Holoprinter for three-dimensional image hardcopy, Journal of The Society of Electrophotography of Japan, Vol. 22, No. 4, pp-342–345, 1993.

In the case of those holographic printers, however, reference light for recording must correspond to reference light for reproduction because a two-dimensional image is displayed on a liquid crystal panel in association with an actual image displayed in a space and an interference pattern as a result of interference between light modulated by the two-dimensional image and reference light is recorded in a recording medium. This results in a problem in that it is difficult to create a variety of holograms for which different beams of reference light are used for reproduction.

The above-described holographic printers have another problem in that they have a complicated mechanism because there is a need for separated optical systems for illuminating a recording medium with light modulated by a two-dimensional image and for illuminating the recording medium with reference light.

DISCLOSURE OF THE INVENTION

The present invention has been conceived taking such problems into consideration, and it is a first object of the invention to provide an apparatus and a method for forming a hologram which make it possible to form a hologram for reproducing a three-dimensional image easily, free of limitations placed by the size of the three-dimensional image to be reproduced, the size of the hologram and reference light for reproduction.

In addition to the first object, it is a second object of the invention to provide an apparatus and a method for forming a hologram which make it possible to form a three-dimensional hologram.

In addition to the first object, it is a third object of the invention to provide an apparatus and a method for forming a hologram which make it possible to form a hologram with a simple mechanism.

A hologram forming apparatus according to the invention is a hologram forming apparatus for forming a hologram for reproducing a three-dimensional image by recording an interference pattern for generating reproduction light associated with a desired three-dimensional image when illuminated with reference light for reproduction in a recording medium on which information is recorded utilizing holography, the apparatus having a head for illuminating a part of the recording medium with a plurality of beams of recording light for forming a part of the interference pattern to record the part of the interference pattern and position change means for changing the relative positional relationship between the head and recording medium.

The hologram forming apparatus according to the invention forms a hologram by performing the operation of illuminating a part of a recording medium with a plurality of beams of recording light for forming a part of an interference pattern to record the part of the interference pattern using the head a plurality of times while changing the relative positional relationship between the head and recording medium with the position change means.

A method for forming a hologram according to the invention is a method for forming a hologram for reproducing a three-dimensional image by recording an interference pattern for generating reproduction light associated with a desired three-dimensional image when illuminated with reference light for reproduction in a recording medium in which information is recorded utilizing holography, in which an operation of illuminating a part of the recording medium with a plurality of beams of recording light for forming a part of the interference pattern to record the part of the interference pattern is performed a plurality of times while changing the relative positional relationship between the recording medium and the beams of recording light.

Other objects, features and advantages of the invention will become sufficiently apparent from the following description.

BRIEF DESCRIPTION OF THE DRAWINGS

FIGS. 10A through 10D are illustrations of operations of the light source devices and spatial light modulator in FIG. 1.

BEST MODES FOR CARRYING OUT THE INVENTION

Figure 1:
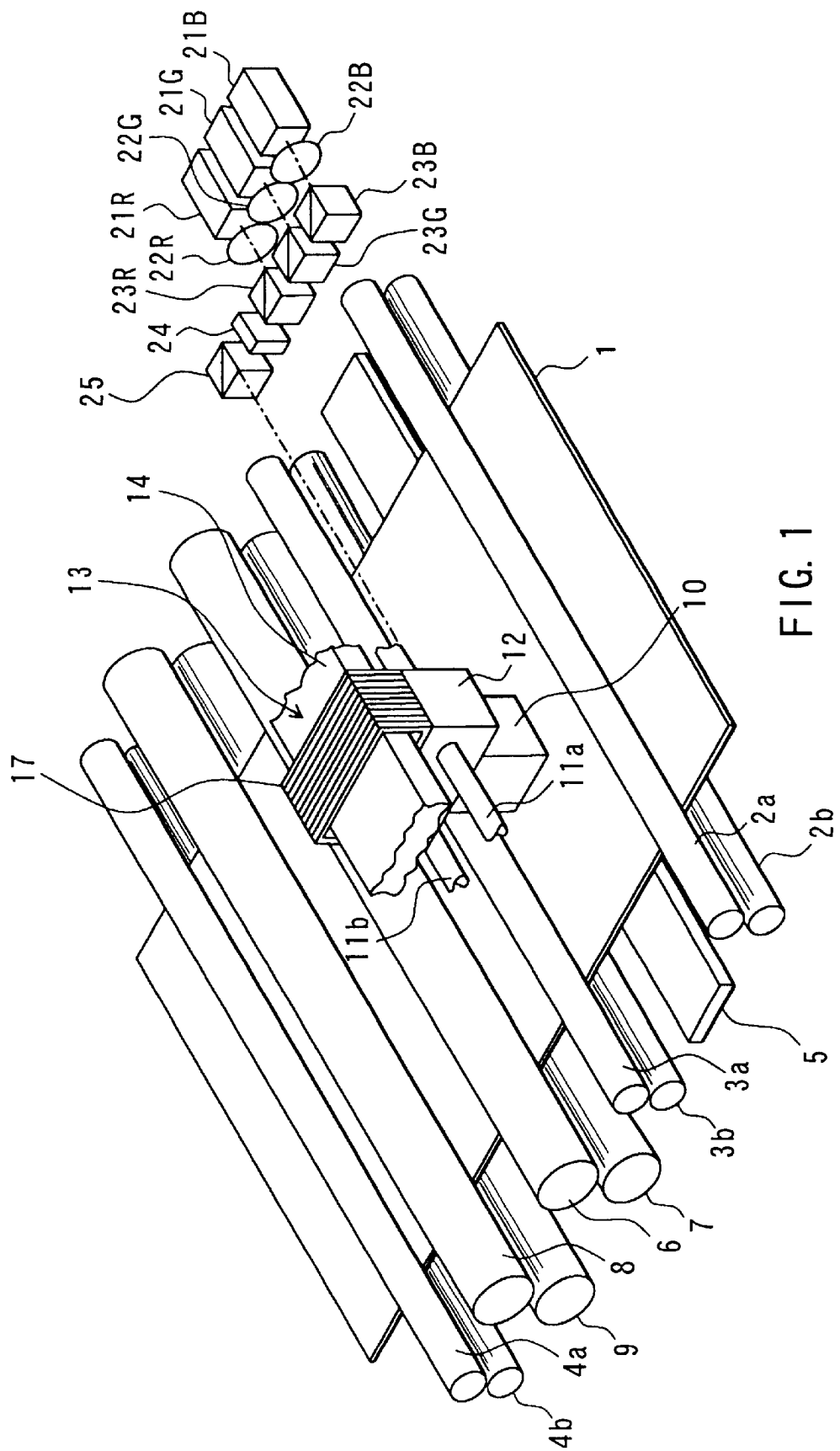
FIG. 1 is a perspective view of a configuration of a hologram forming apparatus according to a first embodiment of the invention.
Figure 2:
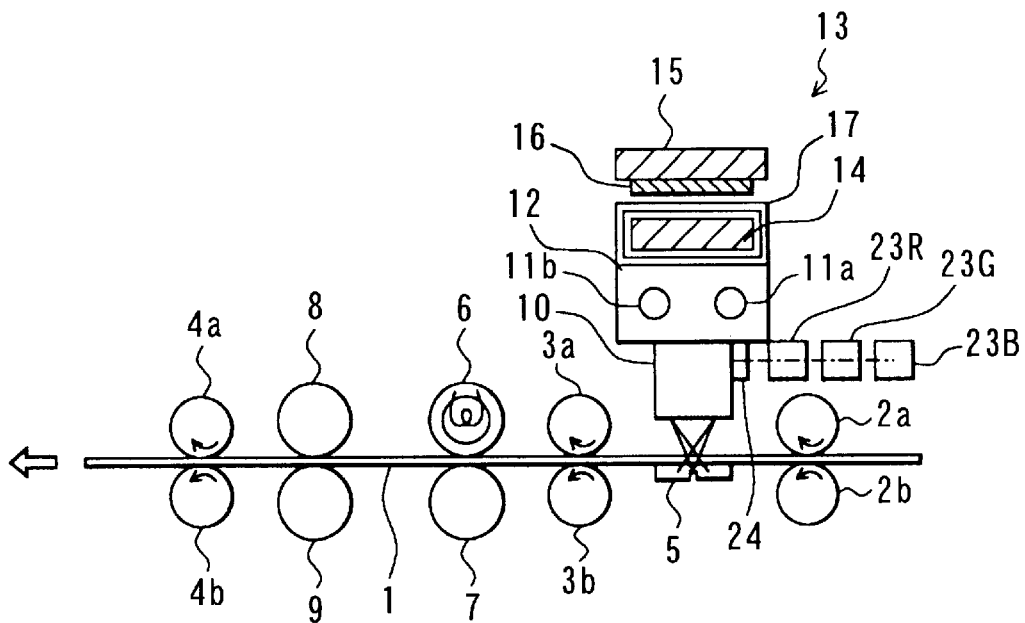
FIG. 2 is a partially cutaway front view of the hologram forming apparatus shown in FIG. 1.
Figure 3:
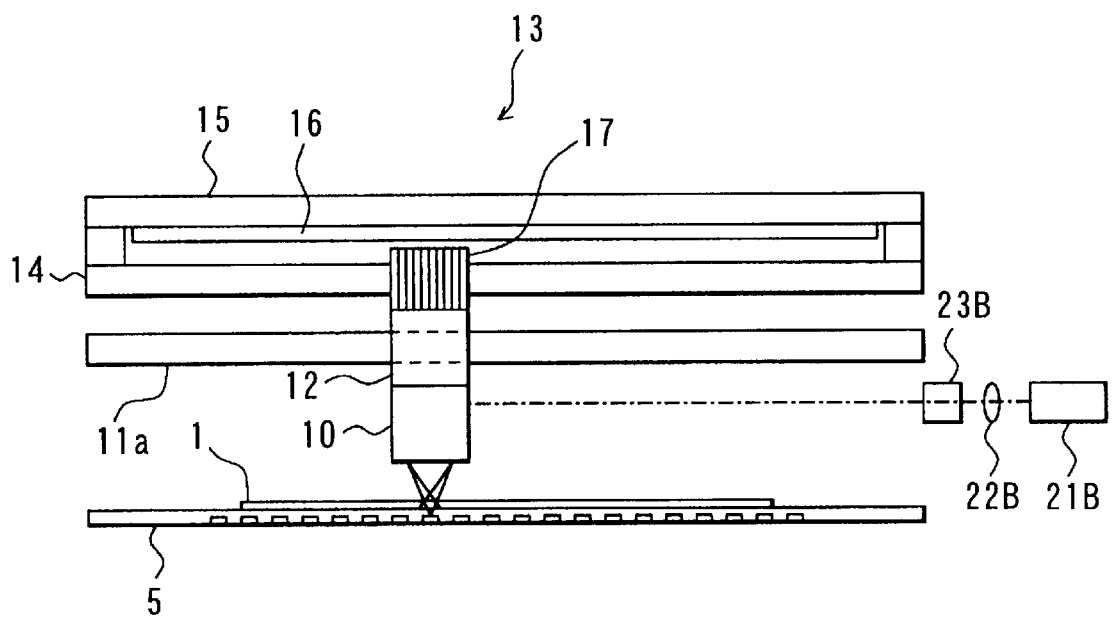
FIG. 3 is a side view of the hologram forming apparatus shown in FIG. 1.

Embodiments of the invention will now be described in detail with reference to the accompanying drawings. FIG. 1 is a perspective view of a configuration of a hologram forming apparatus according to a first embodiment of the invention. FIG. 2 is a partially cutaway front view of the hologram forming apparatus shown in FIG. 1. FIG. 3 is a side view of the hologram forming apparatus shown in FIG. 1. As shown in those figures, the hologram forming apparatus according to the present embodiment has: three pairs of cylindrical transport rollers 2a, 2b; 3a, 3b; and 4a, 4b for transporting a sheet-like recording medium 1 in which information is recorded utilizing holography from a supply portion (not shown) to an ejecting portion (not shown); a plate-like guide portion 5 provided in parallel with the transport rollers 2a, 2b and 3a, 3b in the axial direction thereof in a position under the recording medium 1 between the transport rollers 2a, 2b and transport rollers 3a, 3b; and a head 10 provided opposite to the guide portion 5 with the recording medium 1 interposed therebetween, for illuminating a part of the recording medium 1 with two beams of recording light for forming a part of an interference pattern to be recorded in the recording medium 1 to thereby record the part of the interference pattern.

The hologram forming apparatus further has: a cylindrical ultraviolet lamp 6 provided in a position above the recording medium 1 between the transport rollers 3a, 3b and transport rollers 4a, 4b; a cylindrical pinch roller 7 provided under the ultraviolet lamp 6 for holding the recording medium 1 in cooperation with the ultraviolet lamp 6; a cylindrical heat roller 8 provided in a position above the recording medium 1 between the region of the ultraviolet lamp 6 and pinch roller 7 and the region of the transport rollers 4a, 4b; and a cylindrical pinch roller 9 for holding the recording medium 1 in cooperation with the heat roller 8. The ultraviolet lamp 6 illuminates the recording medium 1 with ultraviolet light, and the heat roller 8 applies heat to the recording medium 1. They correspond to fixing means according to the invention.

The hologram forming apparatus further has: two guide shafts 11a, 11b provided in parallel with the transport rollers 2a, 2b and 3a, 3b in the axial direction thereof above the head 10; and a movable portion 12 movable along the guide shafts 11a, 11b under the guidance of the guide shafts 11a, 11b. The head 10 is bonded to a lower end face of the movable portion 12 to be moved with the movable portion 12.

The hologram forming apparatus further has a voice coil motor (hereinafter referred to as "VCM") 13 for moving the movable portion 12 along the guide shafts 11a, 11b. The VCM 13 has: a VCM yoke 14 provided above the guide shafts 11a, 11b in parallel with the guide shafts 11a, 11b; a VCM yoke 15 provided above the VCM yoke 14 in parallel with the VCM yoke 14 with a predetermined interval therebetween and coupled to the VCM yoke 14 at the ends thereof; a plate-like VCM magnet 16 secured to the bottom surface of the VCM yoke 15; and a voice coil 17 provided around the VCM yoke 14 at a predetermined interval from the outer circumferential surface of the VCM yoke 14. The voice coil 17 is bonded to an upper end face of the movable portion 12. FIG. 1 omits the VCM yoke 15 and VCM magnet 16. The VCM 13 having such a configuration moves the head 10 in parallel with the guide shafts 11a, 11b. The VCM 13 constitutes position change means according to the invention for changing the relative positional relationship between the head 10 and recording medium 1.

The hologram forming apparatus further has: an R light source device 21R for emitting coherent laser light in red (hereinafter represented by "R"); a G light source device 21G for emitting coherent laser light in green (hereinafter represented by "G"); a B light source device 21B for emitting coherent laser light in blue (hereinafter represented by "B"); collimator lenses 22R, 22G, 22B for collimating the laser light emitted by the respective light source devices 21R, 21G, 21B; a dichroic prism 23R upon which light impinges through the collimator lens 22R; a dichroic prism 23G upon which light impinges through the collimator lens 22G; and a reflecting prism 23B upon which light impinges through the collimator lens 22B.

The reflecting prism 23B reflects B light which has passed through the collimator lens 22B. The B light reflected by the reflecting prism 23B impinges upon the dichroic prism 23G sideways. The dichroic prism 23G reflects G light which has passed through the collimator lens 22G and transmits the B light from the reflecting prism 23B. Both of the G light reflected by the dichroic prism 23G and the B light transmitted by the dichroic prism 23G impinge upon the dichroic prism 23R sideways. The dichroic prism 23R reflects R light which has passed through the collimator lens 22R and transmits the B light and G light from the dichroic prism 23G. All of the R light reflected by the dichroic prism 23R and the B light and G light transmitted by the dichroic prism 23R exit the dichroic prism 23R in the same direction. The hologram forming apparatus further has: a spatial light modulator 24 for spatially modulating each of the beams of light R, G, B from the dichroic prism 23R; and a reflecting prism 25 for reflecting light which has passed through the spatial light modulator 24 to cause it to impinge upon the head 10.

The spatial light modulator 24 has a multiplicity of pixels arranged in the form of a grid and can select the direction of polarization of light emitted by each of the pixels to spatially modulate light by means of the different polarizing directions. For example, the spatial light modulator 24 specifically has a configuration similar to that of a liquid crystal display element utilizing rotatory polarization of liquid crystals excluding the polarizing plate. The spatial light modulator 24 is adapted to rotate the polarizing direction of each pixel at +90° when it is off and not to rotate the polarizing direction when it is on. For example, ferroelectric liquid crystals having a high response speed (on the order of microsecond) may be used as the liquid crystals of the spatial light modulator 24. This allows recording at a high speed.

A configuration of the head 10 will now be described with reference to FIG. 4. The head 10 has an objective lens 32 provided in a face-to-face relationship with the recording medium 1; an actuator 33 movable in the direction of the thickness of the recording medium 1 and the transporting direction of the same; and a double optically rotating plate 34, an S-polarized hologram 35, a beam splitter 37, a convex lens 38, a cylindrical lens 39 and a quadruple photodetector 40 which are disposed on the side of the objective lens 32 opposite to the recording medium 1 in the order listed that is the order of their closeness to the objective lens 32.

The beam splitter 37 has a half-reflecting surface 37a provided at an angle of 45° to the direction of the optical axis of the objective lens 32 for reflecting a part of the quantity of light incident thereupon and for transmitting a part of the quantity of light. The light from the reflecting prism 25 in FIG. 1 impinges upon the beam splitter 37 sideways, and a part of the quantity of light is reflected by the half-reflecting surface 37a to impinge upon the S-polarized hologram 35.

The S-polarized hologram 35 has a lens function to converge only S-polarized light. When P-polarized light in the form of parallel beams from the beam splitter 37 impinges upon the S-polarized hologram 35, the light passes through the S-polarized hologram 35 in the form of parallel beams to be collected by the objective lens 32 and projected upon the recording medium 1. The light convergingly passes through the recording medium 1 and converges to a minimum diameter at the further side of the recording medium 1. When S-polarized light in the form of parallel beams from the beam splitter 37 impinges upon the S-polarized hologram 35, the light is slightly converged by the S-polarized hologram 35 and then collected by the objective lens 32 to be projected upon the recording medium 1. The light temporarily converges to a minimum diameter before the recording medium 1 and thereafter divergingly passes through the recording medium 1.

S-polarized light is linear polarized light whose polarizing direction is perpendicular to the plane of incidence (the plane of FIG. 4), and P-polarized light is linear polarized light whose polarizing direction is in parallel with the plane of incidence.

Figure 4:
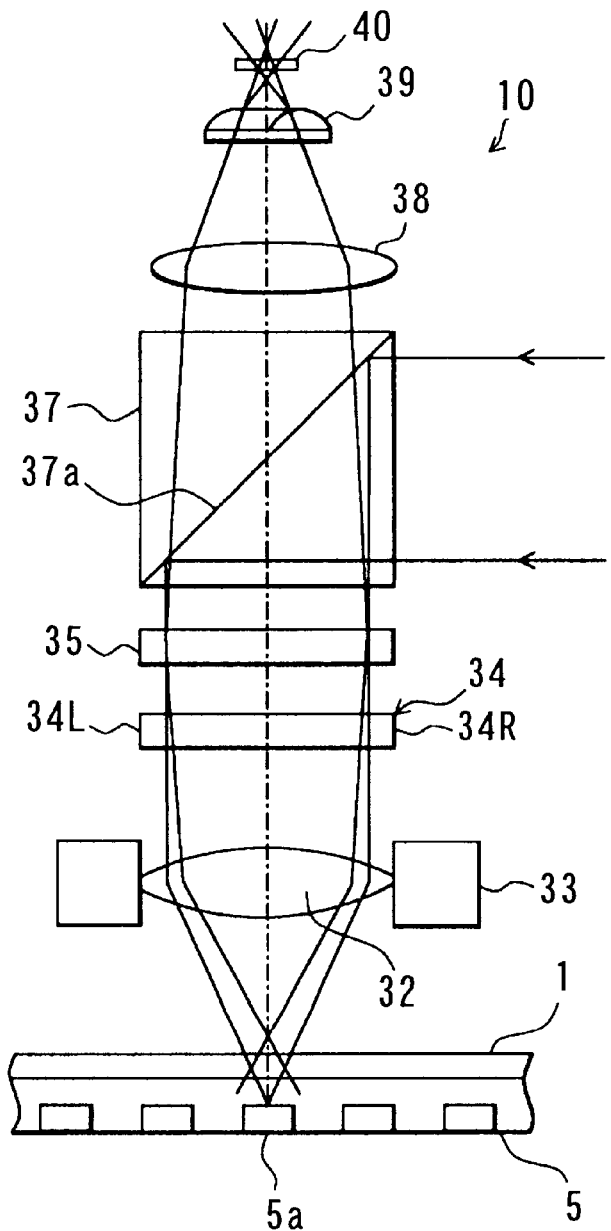
FIG. 4 is an illustration of a configuration of the head in FIG. 1.

The double optically rotating plate 34 has: an optically rotating plate 34L provided on the left side of the optical axis in FIG. 4; and an optically rotating plate 34R provided on the right side of the optical axis in FIG. 4. The optically rotating plate 34L rotates a polarizing direction at −45°, and the optically rotating plate 34R rotates a polarizing direction at +45°.

Information for tracking servo and address information is recorded in the form of embossed pits 5a arranged on the lower end of the guide portion 5 in the moving direction of the head 10. The illuminated light converged by the objective lens 32 to a minimum diameter at the further side of the recording medium 1 is reflected by the lower end of the guide portion 5 to become return light modulated by the embossed pits 5a, to impinge upon the objective lens 32. The return light passes through the double optically rotating plate 34 and the S-polarized hologram 35 to impinge upon the beam splitter 37, and a part of the quantity of light is transmitted by the half-reflecting surface 37a to impinge upon the quadruple photodetector 40 after passing through the convex lens 38 and cylindrical lens 39.

Figure 7:
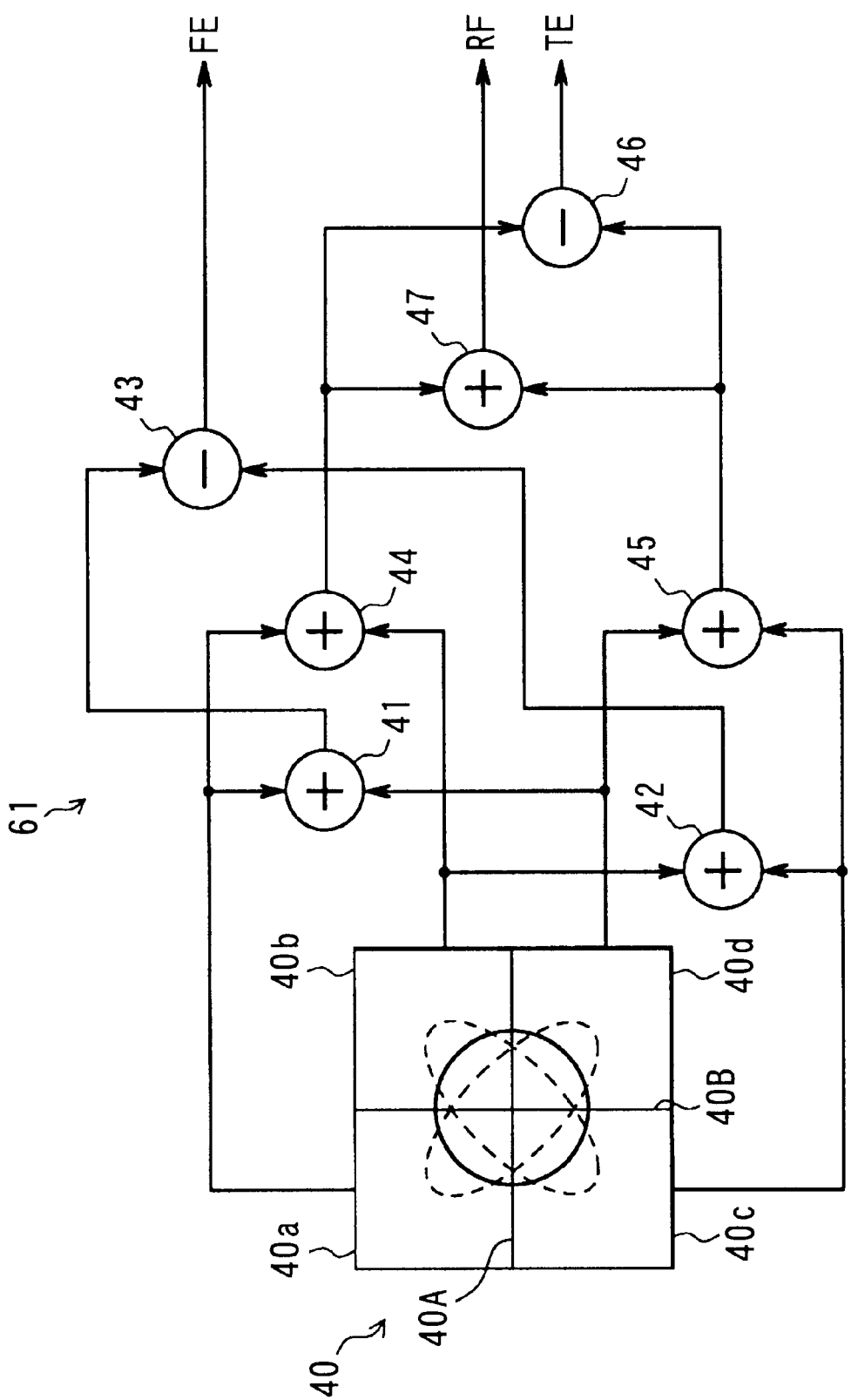
FIG. 7 is a block diagram of a configuration of the detection circuit in FIG. 6.

As shown in FIG. 7, the quadruple photodetector 40 has four light-receiving portions 40a through 40d divided by a division line 40A in parallel with the moving direction of the head 10 and a division line 40B orthogonal thereto. The cylindrical lens 39 is provided such that the central axis of the cylindrical surface thereof is at an angle of 45° to the division lines 40A and 40B of the quadruple photodetector 40.

An example of a configuration of the recording medium 1 will now be described with reference to FIG. 5. Color three-dimensional image information can be recorded on and reproduced from the recording medium 1 shown in FIG. 5. The recording medium 1 is formed by stacking hologram layers 52B, 52G and 52R in which information is recorded in the form of a three-dimensional interference pattern using volume holography and a protection layer 53 in the order listed on one surface of a transparent base material 51. Each of the hologram layers 52B, 52G and 52R is formed of a hologram material whose optical characteristics such as the refractive index, permittivity and reflectivity change depending on the intensity of light illuminating the same. It should be noted here that the optical characteristics of the hologram layer 52B are changed only by B light; the optical characteristics of the hologram layer 52G are changed only by G light; and the optical characteristics of the hologram layer 52R are changed only by R light. For example, photopolymers are used as the hologram materials.

When the recording material 1 is to allow recording and reproduction of monochromatic three-dimensional image information, the hologram layers 52B, 52G and 52R may be replaced with a single hologram layer whose optical characteristics change depending on the light used.

Figure 6:
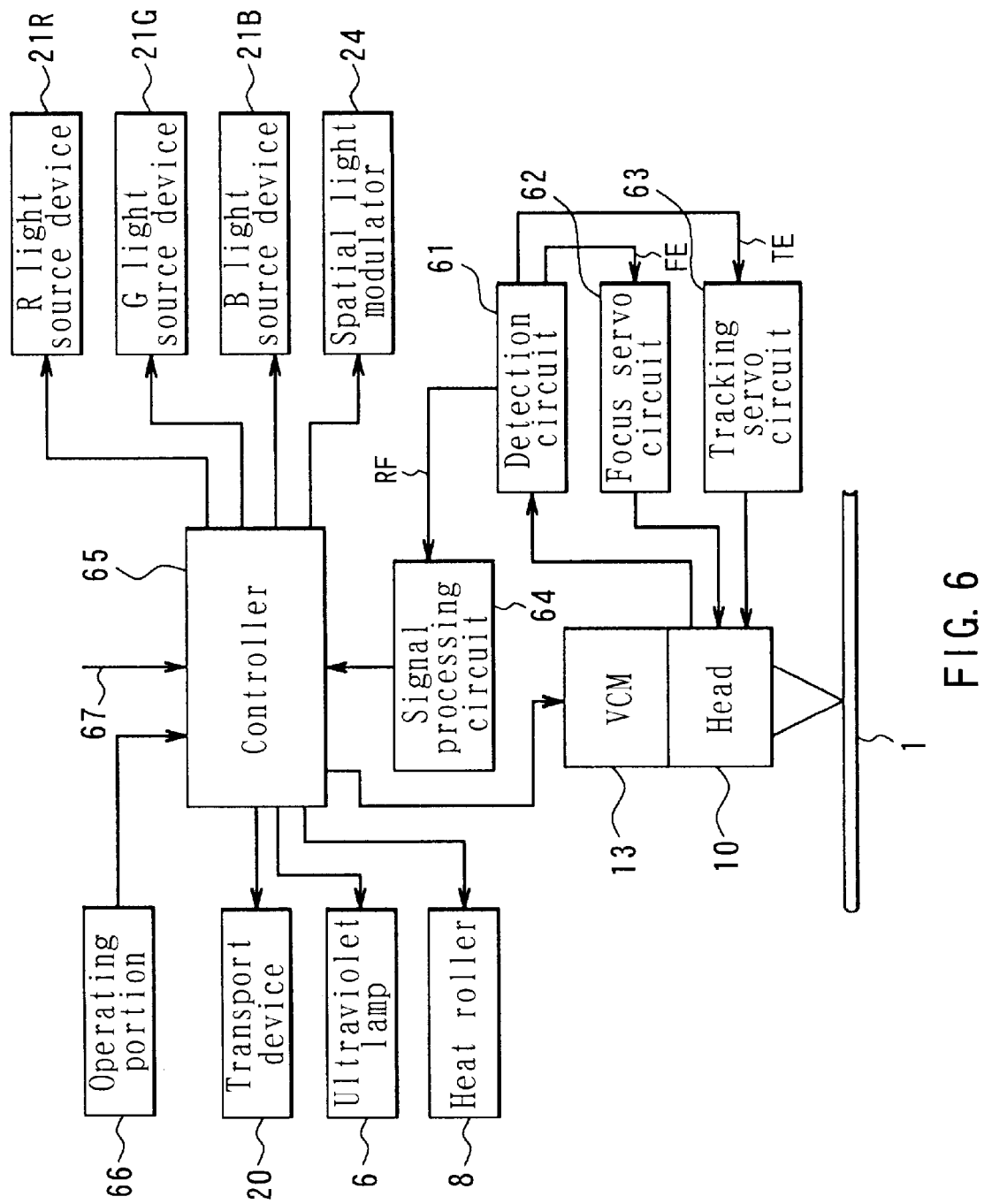
FIG. 6 is a block diagram of a circuit configuration of the hologram forming apparatus according to the first embodiment of the invention.

FIG. 6 is a block diagram of a circuit configuration of the hologram forming apparatus according to the present embodiment. As shown in FIG. 6, the hologram forming apparatus has: a detection circuit 61 for detecting a focus error signal FE, a tracking error signal TE and a reproduction signal RF from an output signal of the head 10; a focus servo circuit 62 for performing focus servo by driving the actuator 33 in the head 10 based on the focus error signal FE detected by the detection circuit 61 to move the objective lens 32 in the direction of the thickness of the recording medium 1; and a tracking servo circuit 63 for performing tracking servo by driving the actuator 33 in the head 10 based on the tracking error signal TE detected by the detection circuit 61 to move the objective lens 32 in the direction in which the recording medium 1 is transported.

The hologram forming apparatus has a signal processing circuit 64 for reproducing a basic clock and determining an address from the reproduction signal RF from the detection circuit 61 and has a controller 65 for controlling the hologram forming apparatus as a whole. The controller 65 receives input of the basic clock and address information outputted by the signal processing circuit 64 and controls the VCM 13, R light source device 21R, G light source device 21G, B light source device 21B, spatial light modulator 24, transport device 20, ultraviolet lamp 6 and heat roller 8. The transport device 20 is a device for transporting the recording medium 1 from a supply portion (not shown) to an ejecting portion (not shown) and includes transport rollers 2a, 2b; 3a, 3b; and 4a, 4b. The transport device 20 constitutes position change means according to the invention.

The controller 65 has a function of receiving input of three-dimensional image information 67 from the outside and calculating a modulation pattern for information light for recording based on the three-dimensional image information 67.

The actuator 33, detection circuit 61, focus servo circuit 62 and tracking servo circuit 63 correspond to position control means according to the invention.

The hologram forming apparatus further has an operating portion 66 for providing various instructions to the controller 65. The controller 65 has a CPU (central processing unit), a ROM (read only memory) and a RAM (random access memory), and the CPU executes programs stored in the ROM using the RAM as a work area to achieve the functions of the controller 65.

FIG. 7 is a block diagram showing a configuration of the detection circuit 61 for detecting the focus error signal FE, tracking error signal TE and reproduction signal RF based on the output of the quadruple photodetector 40. The detection circuit 61 has: an adder 41 for adding the output of each of the diagonal light-receiving portions 40a and 40d of the quadruple photodetector 40; an adder 42 for adding the output of each of the diagonal light-receiving portions 40b and 40c of the quadruple photodetector 40; a subtracter 43 for calculating the difference between the outputs of the adders 41 and 42 to generate the focus error signal FE based on a stigmatic method; an adder 44 for adding the output of each of the light-receiving portions 40a and 40b of the quadruple photodetector 40 which are adjacent to each other in the moving direction of the head 10; an adder 45 for adding the output of each of the light-receiving portions 40c and 40d of the quadruple photodetector 49 which are adjacent to each other in the moving direction of the head 10; a subtracter 46 for calculating the difference between the outputs of the adders 44 and 45 to generate the tracking error signal TE based on a push-pull method; and an adder 47 for adding the outputs of the adders 44 and 45 to generate the reproduction signal RF. In the present embodiment, the reproduction signal RF is a signal which is the reproduction of the information recorded in the embossed pits 5a of the guide portion 5.

Figure 8:
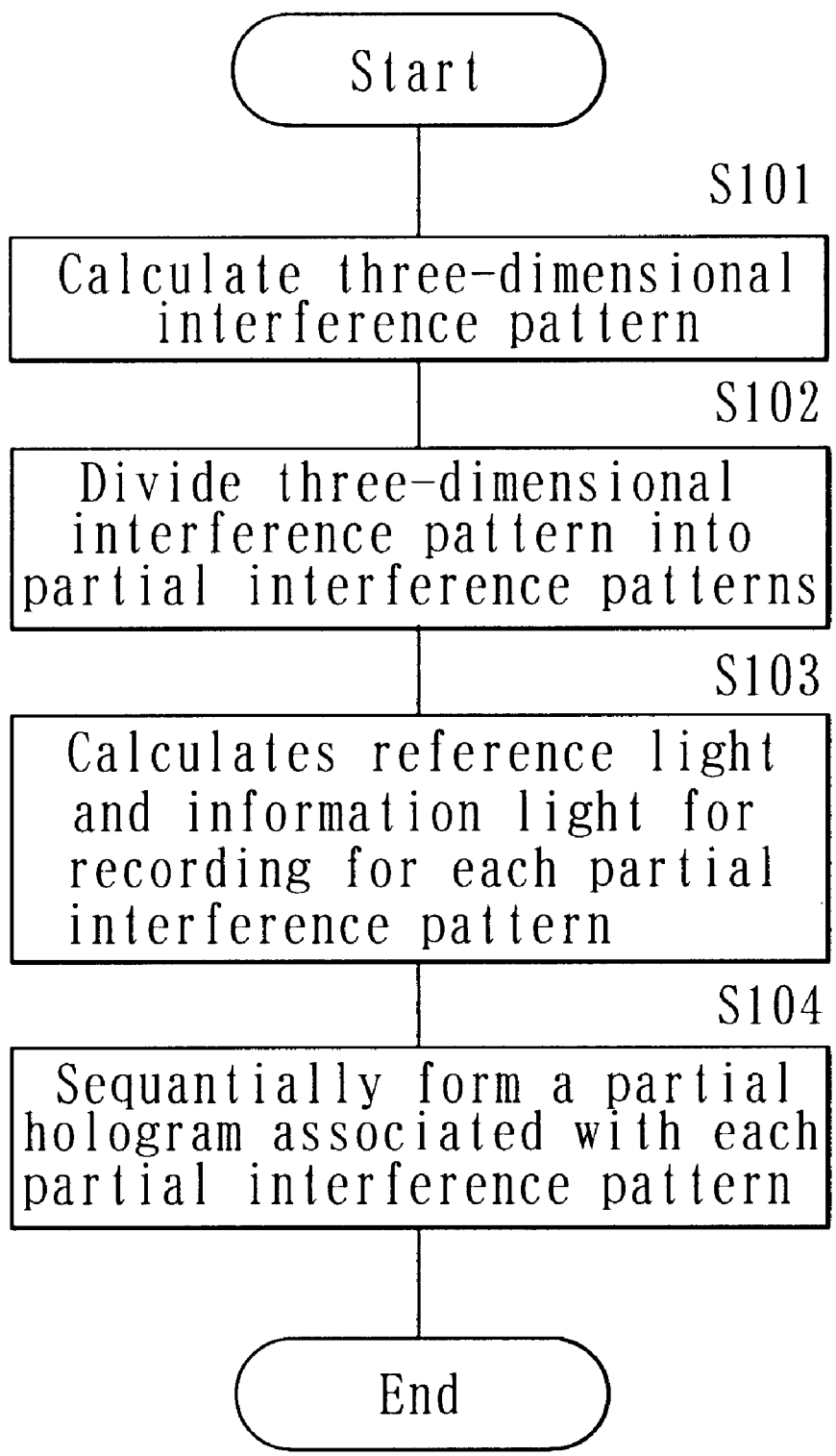
FIG. 8 is a flow chart of an operation of the hologram forming apparatus according to the first embodiment of the invention.

An operation of the hologram forming apparatus according to the present embodiment will now be described. The following description will also refer to a method for forming a hologram according to the embodiment. An operation of the hologram forming apparatus will be first briefly described with reference to FIGS. 8 and FIGS. 9A through 9D. FIG. 8 is a flow chart of an operation of the hologram forming apparatus according to the present embodiment, and FIGS. 9A through 9D are illustrations of a method for forming a hologram according to the present embodiment and a method for reproducing a three-dimensional image from a hologram formed thereby.

Figures 9A, 9B, 9C, 9D:
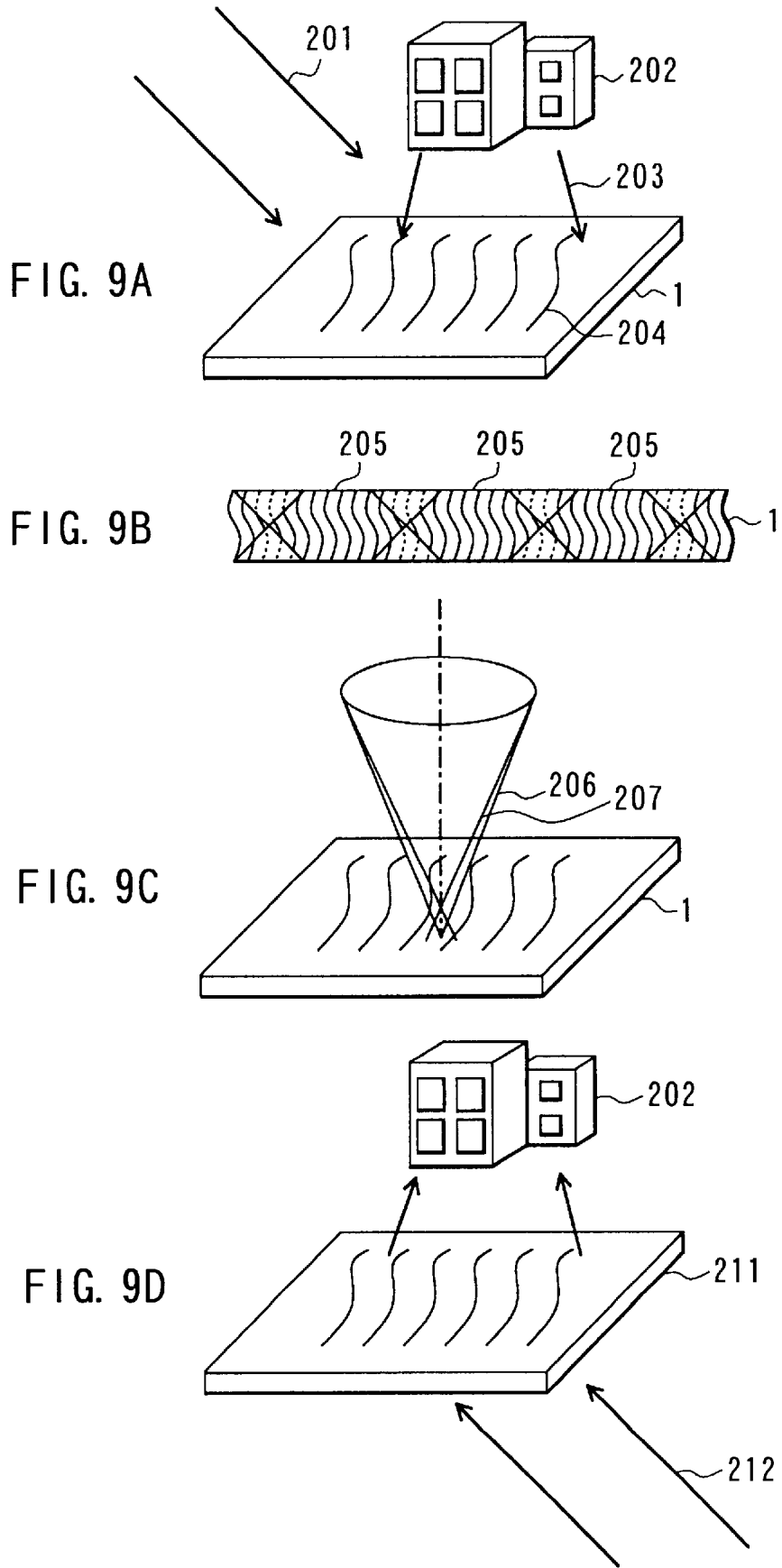
FIGS. 9A through 9D are illustrations of a method for forming a hologram according to the first embodiment of the invention and a method for reproducing a three-dimensional image from a hologram formed thereby.

In the hologram forming apparatus of the present embodiment, the controller 65 first calculates a three-dimensional interference pattern for generating reproduction light associated with a desired three-dimensional image when the recording medium 1 is illuminated with reference light for reproduction (step S101). Specifically, the technique of computerized holography is applied to reference light 201 and object light 203 from a three-dimensional image 202 to be represented which are assumed to be present as shown in FIG. 9A to calculate a three-dimensional interference pattern 204 which will be formed in the recording medium 1 when the recording medium 1 is illuminated with the reference light 201 and object light 203. While the reference light in FIG. 9A is assumed to be parallel light, the reference light may be divergent light or convergent light.

For example, the calculation of the three-dimensional interference pattern 204 is specifically carried out as follows. First, on a predetermined plane on which a coordinate is represented by (x, y), amplitude and phase information of the reference light 201 and object light 203 is respectively represented by $R_1(x, y)$ and $O_1(x, y)$ and expressed by the following equations. In the following equations, $r_1$ and $o_1$ represent amplitudes, and $\phi_{R1}$ and $\phi_{O1}$ represent phases.

$$R_1(x, y) = r_1(x, y)\exp\{j\phi_{R1}(x, y)\}$$

$$O_1(x, y) = o_1(x, y)\exp\{j\phi_{O1}(x, y)\}$$

When the reference light 201 and object light 203 interfere with each other on the predetermined plane, intensity of light $I_1(x, y)$ on the predetermined plane is expressed by the following Equation (1):

$$I_1(x, y) = \{r_1(x, y)\}^2 + \{o_1(x, y)\}^2 + 2r_1(x, y)o_1(x, y)\cos(\phi_{R1} - \phi_{O1}) \quad (1)$$

The three-dimensional interference pattern 204 in the recording medium 1 can be calculated by calculating intensity of light $I_1(x, y)$ for each of a plurality of planes assumed to be present in the recording medium 1. The amplitude and phase information $O_1(x, y)$ of the object light 203 may be calculated based on the information of the three-dimensional image to be reproduced (e.g., three-dimensional image data to be processed by a computer). The amplitude and phase information $R_1(x, y)$ of the reference light 201 may be determined in advance.

Next, as shown in FIG. 9B, the controller 65 divides the three-dimensional interference pattern 204 into partial interference patterns 205 (step S102). In the present embodiment, the partial interference patterns 205 are parts of the three-dimensional interference pattern 204 as shown in FIG. 9B and are three-dimensional interference patterns in regions in the recording medium 1 where two beams of recording light emitted by the head 10 overlap. Hereinafter, one of the two beams of recording light is referred to as "reference light for recording", and the other is referred to as "information light for recording".

Next, the controller 65 calculates the reference light for recording and information light for recording for each of the partial interference patterns 205 (step S103). For example, this is specifically performed as described below. First, on a plane in which a coordinate is represented by (x, y), the amplitude and phase information of the reference light for recording is represented by $R_2(x, y)$ and the amplitude and phase information of the information light for recording is represented by and $O_2(x, y)$, which are respectively expressed by the following equations. In the following equations, $r_2$ and $o_2$ represent amplitudes, and $\phi_{R2}$ and $\phi_{O2}$ represent phases.

$$R_2(x, y) = r_2(x, y)\exp\{j\phi_{R2}(x, y)\}$$

$$O_2(x, y) = o_2(x, y)\exp\{j\phi_{O2}(x, y)\}$$

When the reference light for recording and the information light for recording interfere with each other on the predetermined plane, intensity of light $I_2(x, y)$ on the predetermined plane is expressed by the following Equation (2):

$$I_2(x, y) = \{r_2(x, y)\}^2 + \{o_2(x, y)\}^2 + 2r_2(x, y)o_2(x, y)\cos(\phi_{R2} - \phi_{O2}) \quad (2)$$

Since the intensity of light $I_1(x, y)$ on each of the planes assumed to be present in the partial interference pattern 205 has already been obtained from Equation 1, the reference light for recording and the information light for recording are calculated for each of the planes such that $I_1(x, y) = I_2(x, y)$ or $I_1(x,y).I_2(x, y)$ will be satisfied. In this case, the calculation is simple if the reference light for recording is uniform light or light which is in a constant relationship with the information light for recording.

Next, according to the result of the calculation of the reference light for recording and the information light for recording, the controller 65 calculates a modulation pattern that provides desired reference light for recording and information light for recording, and controls the spatial light modulator 24 using the modulation pattern to illuminate the recording medium 1 with reference light 206 for recording and information light 207 for recording as shown in FIG. 9C. Thus, each of the partial interference patterns 205 is actually recorded in the recording medium 1, and partial holograms associated with the respective partial interference patterns 205 (hereinafter referred to as "partial holograms") are sequentially formed (step S104) to form a hologram as a whole.

In the present embodiment, since the recording medium 1 is illuminated with the reference light 206 and information light 207 for recording on the same side thereof, the hologram thus formed is a transmission type (Fresnel type) hologram.

To reproduce the three-dimensional image 202 from a hologram 211 (recording medium 1) thus formed, the hologram 211 may be illuminated with reference light for reproduction in the same direction as the reference light 201 in FIG. 9A, or may be illuminated with reference light 212 for reproduction in the direction opposite to that of the reference light 201 as shown in FIG. 9D. When the hologram 211 is illuminated with the reference light for reproduction in the same direction as the reference light 201, the three-dimensional image 202 will appear as a virtual image above the hologram 211 when viewed from below the hologram 211 in FIG. 9D. As shown in FIG. 9D, when the hologram 211 is illuminated with the reference light 212 for reproduction in the direction opposite to that of the reference light 201, the three-dimensional image 202 appears as a real image above the hologram 211 when viewed from above the hologram 211.

The operation of the hologram forming apparatus according to the embodiment will now be described in more details. First, the hologram forming apparatus according to the present embodiment is capable of forming a hologram from which a color three-dimensional image can be reproduced. Therefore, in the present embodiment, holograms associated with R, G and B three-dimensional images that form a color three-dimensional image are respectively formed in the hologram layers 52R, 52G and 52B of the recording medium 1. In the present embodiment, specifically, a hologram in each of R, G and B colors is formed by forming a partial hologram in each of R, G and B colors on a time division basis.

For this purpose, the light source devices 21R, 21G and 21B respectively provided for R, G and B colors and the spatial light modulator 24 are controlled as shown in FIGS. 10A through 10D. Specifically, as shown in FIG. 10D, the spatial light modulator 24 is driven repeatedly in a modulation pattern for the partial hologram associated with the R image, a modulation pattern for the partial hologram associated with the G image and a modulation pattern for the partial hologram associated with the B image at a constant cycle. As shown in FIG. 10A, the R light source device 21R emits R light at timing when the spatial light modulator 24 is driven in the modulation pattern associated with the partial hologram for the R image. Similarly, as shown in FIG. 10B, the G light source device 21G emits G light at timing when the spatial light modulator 24 is driven in the modulation pattern associated with the partial hologram for the G image and, as shown in FIG. 10C, the B light source device 21B emits B light at timing when the spatial light modulator 24 is driven in the modulation pattern associated with the partial hologram for the B image.

In the present embodiment, each of the light source devices 21R, 21G and 21B emits S-polarized light. The R light emitted by the R light source device 21R is collimated by the collimator lens 22R and reflected by the dichroic prism 23R to impinge upon the spatial light modulator 24. The G light emitted by the G light source device 21G is collimated by the collimator lens 22G, reflected by the dichroic prism 23G and transmitted by the dichroic prism 23R to impinge upon the spatial light modulator 24. The B light emitted by the B light source device 21B is collimated by the collimator lens 22B, reflected by the reflecting prism 23B and transmitted by the dichroic prisms 23G and 23R to impinge upon the spatial light modulator 24. The light spatially modulated by the spatial light modulator 24 is reflected by the reflecting prism 25 to impinge upon the head 10. The light spatially modulated by the spatially light modulator 24 is light which is set at S-polarization or P-polarization depending on pixels.

Figure 11:
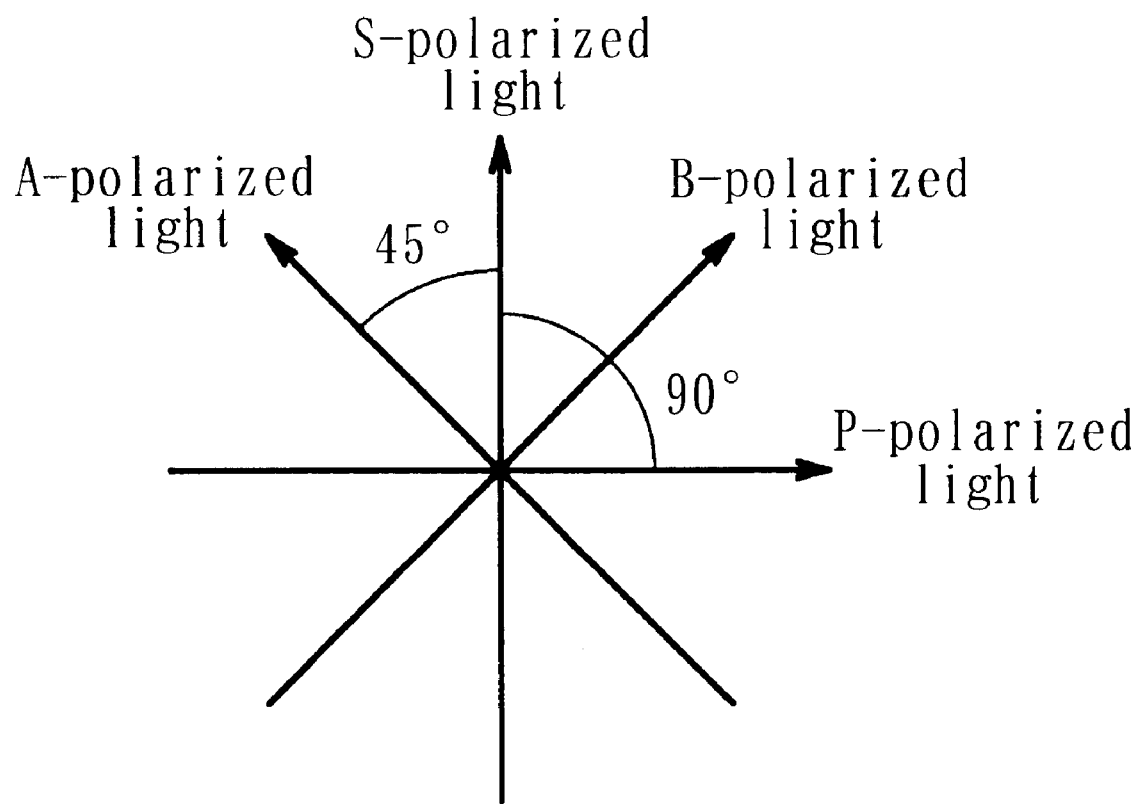
FIG. 11 is an illustration of polarized beams of light used in the first embodiment of the invention.

A definition will be given with reference to FIG. 11 to terms "A-polarized light" and "B-polarized light" which will be used in the following description. A-polarized light is linear polarized light obtained by rotating the polarizing direction of S-polarized light at −45° or by rotating the polarizing direction of P-polarized light at +45°, and B-polarized light is linear polarized light obtained by rotating the polarizing direction of S-polarized light at +45° or by rotating the polarizing direction of P-polarized light at −45°. The polarizing directions of the A-polarized light and B-polarized light are orthogonal to each other.

Light incident upon the head 10 impinges upon the beam splitter 37 sideways, and a part of the quantity of light is reflected by the half-reflecting surface 37a to impinge upon the S-polarized hologram 35. The P-polarized light included in the light incident upon the S-polarized hologram 35 passes through the S-polarized hologram 35 as it is in the form of parallel beams. In the present embodiment, this light is the reference light for recording. The reference light for recording impinges upon the double optically rotating plate 34. A part of the light which has passed through the optically rotating plate 34L is subjected to rotation of the polarizing direction at −45° to become B-polarized light, and a part of the light which has passed through the optically rotating plate 34R is subjected to rotation of the polarizing direction at +45° to become A-polarized light. The reference light for recording is collected by the objective lens 32 to illuminate the recording medium 1. It convergingly passes through the recording medium 1 and converges to a minimum diameter at the further side of the recording medium 1.

The S-polarized light included in the light incident upon the S-polarized hologram 35 is slightly converged by the S-polarized hologram 35. In the present embodiment, this light is the information light for recording. The information light for recording impinges upon the double optically rotating plate 34. A part of the light which has passed through the optically rotating plate 34L is subjected to rotation of the polarizing direction at −45° to become A-polarized light, and a part of the light which has passed through the optically rotating plate 34R is subjected to rotation of the polarizing direction at +45° to become B-polarized light. The information light for recording is collected by the objective lens 32 to illuminate the recording medium 1. It temporarily converges to a minimum diameter before the recording medium 1 and thereafter divergingly passes through the recording medium 1.

As described above, according to the present embodiment, the reference light for recording and the information light for recording illuminate the recording medium 1 on the same side thereof such that the optical axes of those beams of light are a located on the same line.

Figure 12:
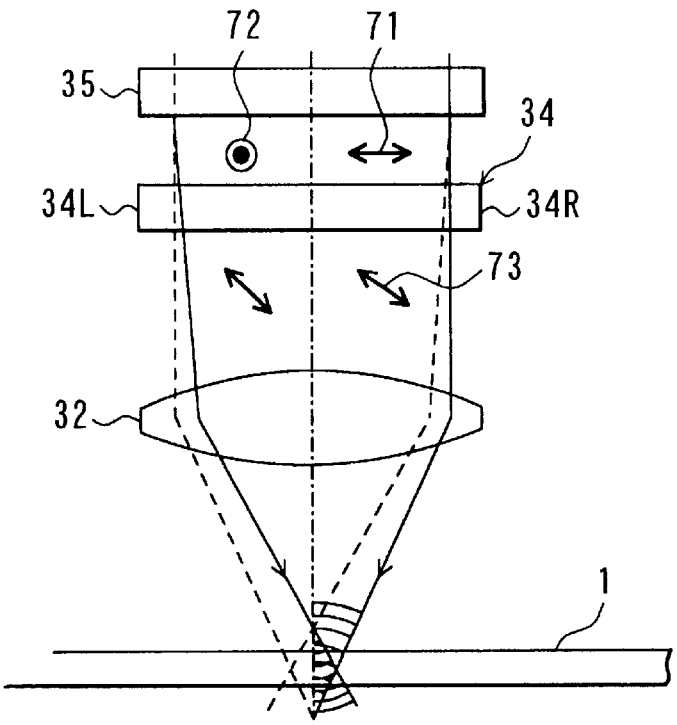
FIG. 12 is an illustration of a state of light in the vicinity of the recording medium in FIG. 1.
Figure 13:
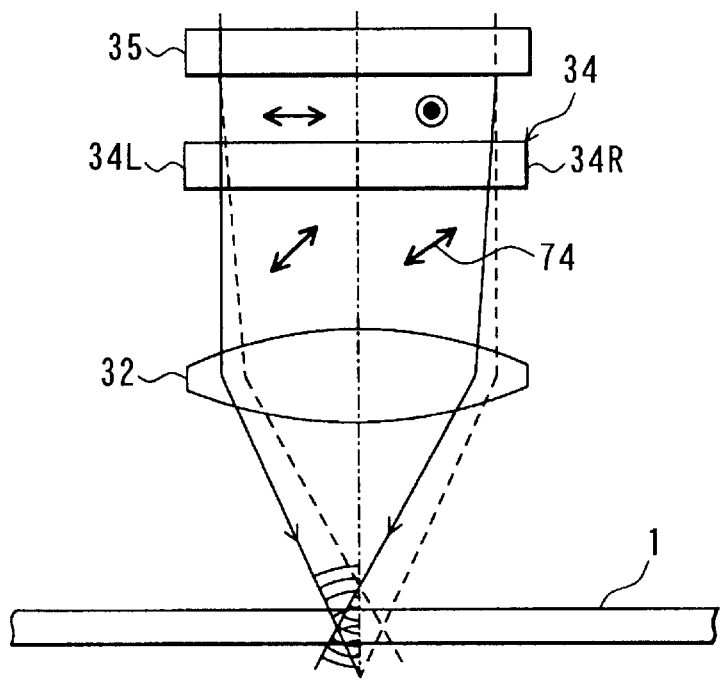
FIG. 13 is an illustration of another state of light in the vicinity of the recording medium in FIG. 1.

FIGS. 12 and 13 are illustrations of states of light in the vicinity of the recording medium 1. In those figures, the reference number 71 represents P-polarized light; the reference number 72 represents S-polarized light; the reference number 73 represents A-polarized light; and the reference number 74 represents B-polarized light. As shown in FIG. 12, reference light for recording which has passed through the optically rotating plate 34R and information light for recording which has passed through the optically rotating plate 34L interfere with each other because they are both A-polarized light, and the pattern of the interference is recorded in the recording medium 1. As shown in FIG. 13, reference light for recording which has passed through the optically rotating plate 34L and information light for recording which has passed through the optically rotating plate 34R interfere with each other because they are both B-polarized light, and the pattern of the interference is recorded on the recording medium 1. Thus, partial holograms are formed in the recording medium 1.

Figure 5:
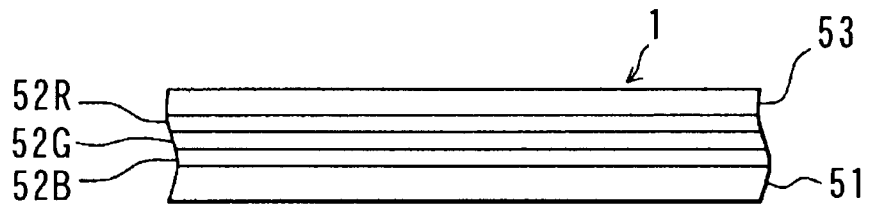
FIG. 5 is a sectional view of an example of a configuration of the recording medium in FIG. 1.

More specifically, when the reference light for recording and the information light for recording are R light, a partial hologram is formed on the hologram layer 52R in FIG. 5. When the reference light for recording and the information light for recording are G light, a partial hologram is formed on the hologram layer 52G in FIG. 5. When the reference light for recording and the information light for recording are B light, a partial hologram is formed on the hologram layer 52B in FIG. 5.

The reference light for recording is reflected by the lower end of the guide portion 5 and is turned into return light which has been modulated by the embossed pits 5a. No interference occurs between A-polarized return light associated with the reference light for recording which has passed through the optically rotating plate 34R and B-polarized information light for recording which has passed through the optically rotating plate 34R because they cross each other. Similarly, no interference occurs between B-polarized return light associated with the reference light for recording which has passed through the optically rotating plate 34L and A-polarized information light for recording which has passed through the optically rotating plate 34L because they cross each other.

The recording medium 1 is transported by the transport device 20, and the transport device 20 keeps the recording medium 1 stationary while the head 10 forms partial holograms for one, line. In such a period, the head 10 sequentially forms partial holograms while moving from one end to the other end of the range where the partial holograms are to be formed. When the partial holograms for one line are formed, the transport device 20 moves the recording medium 1 by a predetermined line interval and thereafter stops the recording medium 1. Partial holograms for the next one line are formed through the same operation as that described above. Such an operation is repeated to form a complete hologram.

While the head 10 is moving, the reference light for recording is reflected by the lower end of the guide portion 5 to be turned into return light modulated by the embossed pits 5a. The return light is collimated by the objective lens 32 and passes through the double optically rotating plate 34 to be turned into S-polarized light which in turn passes through the S-polarized hologram 35 and is slightly converged. Thereafter, the S-polarized light impinges upon the beam splitter 37, and a part of the quantity of light is transmitted by the half-reflecting surface 37a to impinge upon the quadruple photodetector 40 after passing through the convex lens 38 and cylindrical lens 39. The detection circuit 61 detects the focus error signal FE, tracking error signal TE and reproduction signal RF based on the output of the quadruple photodetector 40. Based on the focus error signal FE, the focus servo circuit 62 performs focus servo to always keep the reference light for recording and the information light for recording in a constant positional relationship with the recording medium 1 in the direction of the thickness of the recording medium 1. Based on the tracking error signal TE, the tracking servo circuit 63 performs tracking servo to always keep the reference light for recording and the information light for recording in a constant positional relationship with the recording medium 1 in the transporting direction of the recording medium 1. The signal processing circuit 64 reproduces the basic clock and determines addresses based on the reproduction signal RF.

Figure 14:
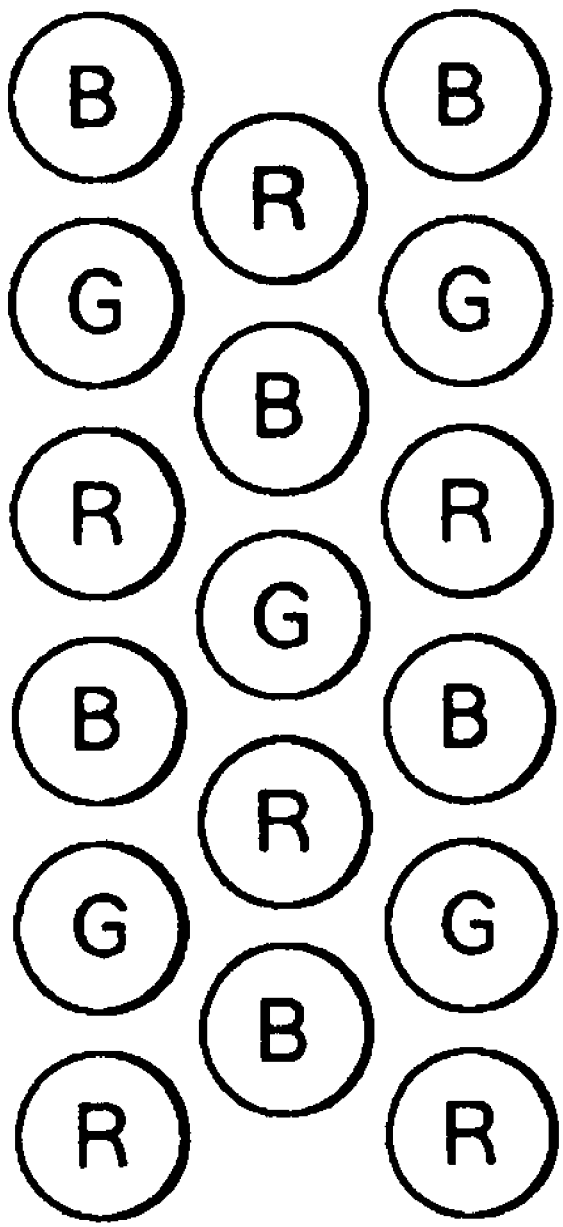
FIG. 14 is an illustration of an example of an arrangement of partial holograms for R, G and B colors respectively formed using the hologram forming apparatus according to the first embodiment of the invention.

FIG. 14 shows an example of an arrangement of partial holograms in each of R, G and B colors. In FIG. 14, the circles indicated by reference symbols R, G and B represent partial holograms in R, G and B colors, respectively.

As a result of the transportation of the recording medium 1 with the transport device 20, a region of the recording medium 1 having holograms formed thereon reaches the position of the ultraviolet lamp 6 which illuminates the region with ultraviolet light, and the region further reaches the position of the heat roller 8 which applies heat to the region to fix the partial interference patterns (partial holograms) recorded by the head 10. When all of the partial holograms have been formed and fixed, the recording medium 1 becomes a stabilized hologram which is in turn transported by the transport device 20 and ejected from the ejecting portion.

Figure 15:
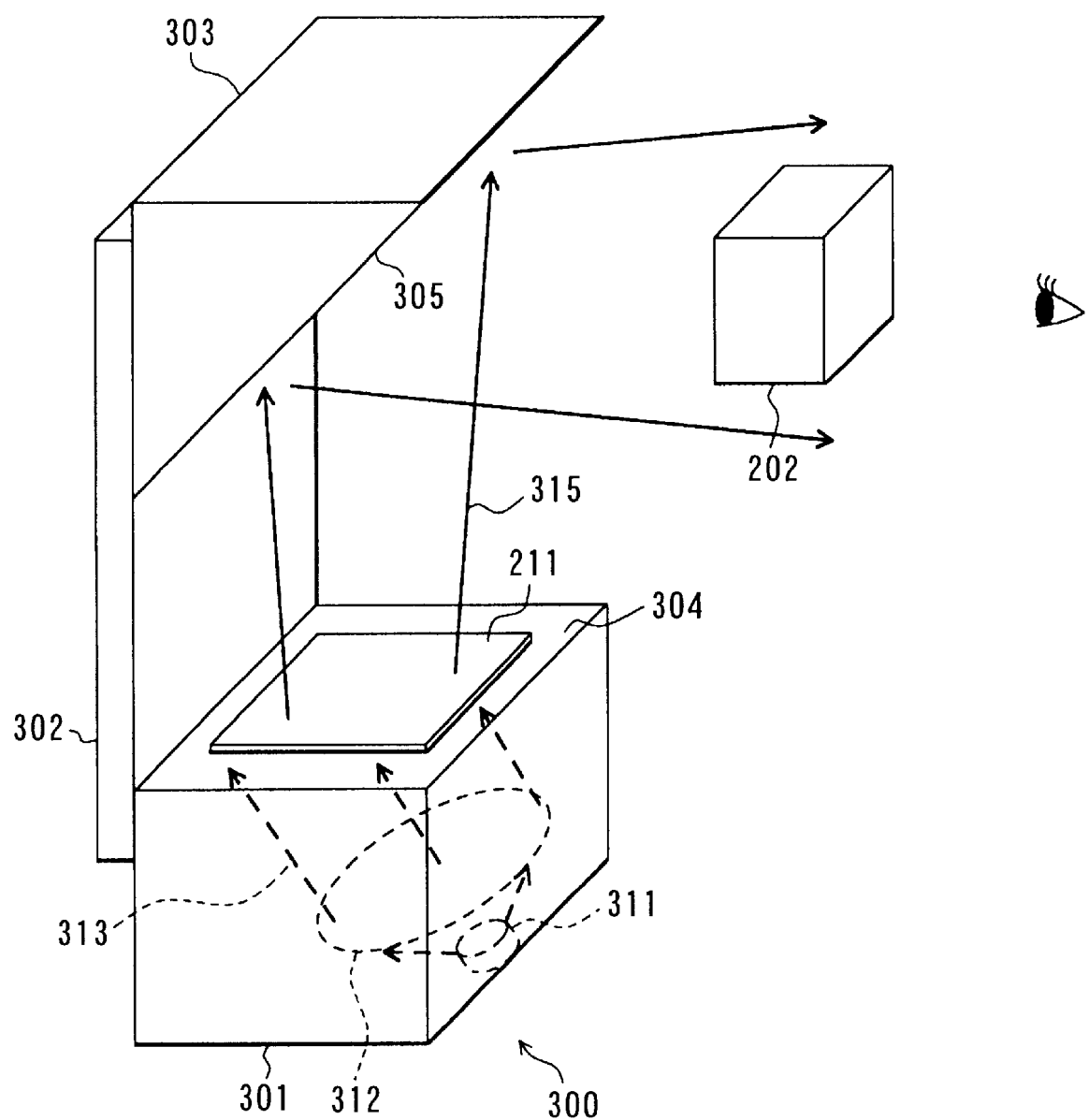
FIG. 15 is a perspective view of an example of a reproducing apparatus for reproducing a three-dimensional image from a hologram formed using the hologram forming apparatus according to the first embodiment of the invention.

A description will now be made with reference to FIG. 15 on an example of a reproducing apparatus for reproducing a three-dimensional image from a hologram formed as described above. A reproducing apparatus 300 shown in FIG. 15 has a configuration similar to that of an overhead projector (hereinafter referred to as "OHP"). The reproducing apparatus 300 has: a cubic main body portion 301; an arm portion 302 extending upward from the rear surface of the main body portion 301; and a mirror portion 303 coupled to the upper end of the arm portion 302. The top surface region of the main body portion 301 is formed by a transparent member such as glass, and the top surface serves as a mounting surface 304 on which a hologram 211 is mounted. In the main body portion 301, there is provided a light source device 311 which emits light to serve as reference light; and an optical system 312 for forming predetermined reference light 313 in the form of parallel light or the like by, for example, collecting the light emitted by the light source device 311 to illuminate the hologram 211 mounted on the mounting surface 304 from below the same. When the reproducing apparatus is to reproduce color three-dimensional images, for example, the light source device 311 emits laser light in each of R, G and B colors or emits white light. When the reproducing apparatus is to reproduce monochromatic three-dimensional images, for example, it emits laser light having a predetermined wavelength.

The reference light 313 illuminates the hologram 211 mounted on the mounting surface 304 from below to generate reproduction light 315 which travels upward from the hologram 211. The mirror portion 303 has a mirror 305 for reflecting the reproduction light 315 generated at the hologram 211 toward the front side of the reproducing apparatus 300. The reproduction light 315 generated at the hologram 211 is reflected by the mirror 305 toward the front side of the reproducing apparatus 300 to form a real three-dimensional image 202. Therefore, a viewer can view the three-dimensional image 202 in front of the reproducing apparatus 300.

A description will now be made with reference to FIG. 16 on another form of hologram that can be formed by the hologram forming apparatus according to the present embodiment. A hologram 320 shown in FIG. 16 has a configuration like a movie film. That is, the hologram 320 as a whole is in the form of a band which is formed with a multiplicity of perforations (holes for feeding) 321 on both sides thereof. A plurality of rectangular hologram portions 322 are formed in the longitudinal direction between the perforations 321 on both sides. Each of the hologram portions 322 corresponds to one frame of a move film and has a three-dimensional interference pattern recorded therein which is associated with one three-dimensional image.

Figure 16:
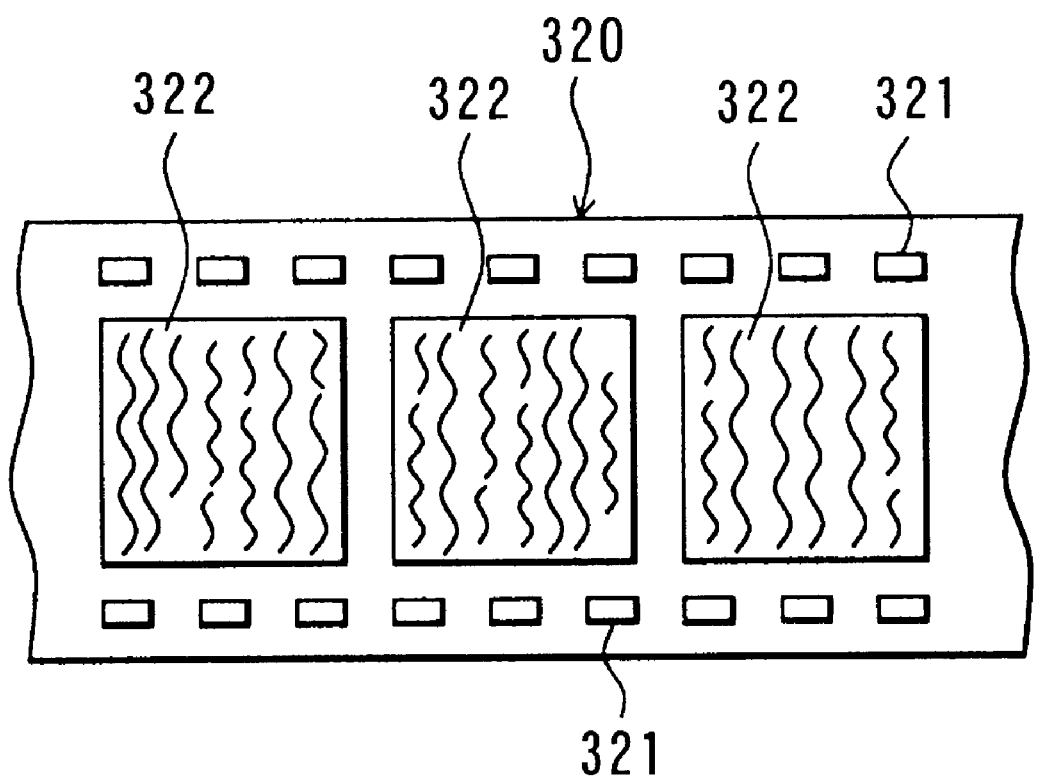
FIG. 16 is an illustration of an example of another form of hologram that can be formed by the hologram forming apparatus according to the first embodiment of the invention.

The hologram 320 shown in FIG. 16 is formed as follows using the hologram forming apparatus according to the present embodiment. First, there is provided a film-like recording medium having perforations 321 on both sides thereof and having a hologram layer at least in regions where hologram portions 322 are formed. Partial holograms are sequentially formed using the hologram forming apparatus with the recording medium transported in the longitudinal direction thereof, and each of the hologram portions 322 is formed by a plurality of partial holograms.

A description will now be made with reference to FIG. 17 on an example of a reproducing apparatus for reproducing a three-dimensional image from the hologram 120 shown in FIG. 16. A reproducing apparatus 330 shown in FIG. 17 has a configuration like that of a projector. The reproducing apparatus 330 has: a driving device (not shown) for moving the hologram 320 intermittently in the longitudinal direction; a light source device 331 for emitting light to serve as reference light; an optical system 332 for forming predetermined reference light 333 in the form of parallel light or the like by, for example, collecting the light emitted by the light source device 331 to illuminate the hologram portions 322 of the hologram 320; and a reflection type screen 336 for reflecting reproduction light 335 generated by the hologram portions 322 when illuminated with the reference light 333. Referring to the light source device 331, it is similar to the light source device 311 of the reproducing apparatus 300 shown in FIG. 15.

In this reproducing apparatus 330, the hologram 320 is intermittently driven by the driving device, and a hologram portion 322 is illuminated with reference light 333 only during a period when the hologram 320 is stopped. The intermittent illumination with the reference light 333 can be performed by causing the light source device 331 to emit light intermittently or by using a shutter. The hologram portion 322 generates reproduction light 335 when illuminated with the reference light 333, and the reproduction light 335 is reflected by the screen 336 toward the front side of the screen 336 to form a real three-dimensional image 337. Therefore, a viewer can view the three-dimensional image 337 in front of the screen 336. When the hologram 320 is driven to illuminate another hologram portion 322 with the reference light 333, another three-dimensional image is reproduced. Therefore, a moving three-dimensional image can be reproduced, for example, by associating each of the hologram portions 322 of the hologram 320 with a three-dimensional image corresponding to each frame of a motion picture as in the case of a movie.

As described above, according to the apparatus and method for forming a hologram of the present invention, a hologram is formed by illuminating a part of the recording medium 1 with reference light for recording and information light for recording using the head 10 to record a part of an interference pattern for generating reproduction light associated with a desired three-dimensional image when illuminated with reference light for reproduction, and by repeating the operation of recording a part of an interference pattern a plurality of times while changing the relative positional relationship between the head 10 and recording medium 1. This makes it possible to form a hologram for reproducing a three-dimensional image easily free of limitations placed by the size of the three-dimensional image to be reproduced and the size of the hologram.

Further, according to the present embodiment, a calculation is made to obtain a plurality of beams of recording light for forming a part of an interference pattern for generating reproduction light associated with a desired three-dimensional image when illuminated with reference light for reproduction; a modulation pattern that provides such beams of recording light is calculated; beams of recording light modulated in the modulation pattern are generated; and the recording medium 1 is illuminated with the beams of recording light always in the same direction. It is therefore possible to form a hologram for reproducing a three-dimensional image free of limitations placed by the reference light for reproduction.

According to the present embodiment, since an interference pattern is recorded part by part, holograms in various shapes can be formed. For example, when a cylindrical or spherical hologram is to be formed, a hologram having the ultimate shape may be formed as a combination of several fragments each of which is formed using the hologram forming apparatus according to the present embodiment.

According to the present embodiment, the recording medium 1 that allows recording of a three-dimensional interference pattern is used, and a three-dimensional interference pattern is recorded on the recording medium 1. This makes it possible to utilize Bragg diffraction effectively and to thereby provide improved diffracting efficiency and improved rendering capability in representing a three-dimensional image.

According to the present embodiment, the recording medium 1 is formed in a sheet-like configuration and is illuminated with reference light for recording and information light for recording on the same side thereof such that the optical axes of those beams of light are located on the same line. This makes it possible to illuminate the recording medium 1 with reference light for recording and information light for recording using a single head 10 and to provide the optical system of the head 10 with a more compact configuration.

According to the present embodiment, reference light for recording reflected by the guide portion 5 is used to control the positions of the reference light for recording and the information light for recording relative to the recording medium 1. This makes it possible to form a hologram with high accuracy.

According to the present embodiment, a hologram having arbitrary three-dimensional image information recorded therein can be easily formed similarly to printing using a normal printer. It is therefore possible to copy a hologram easily and to form a great number of holograms having the same three-dimensional image information recorded therein. When a hologram forming apparatus and a reproducing apparatus for reproducing a three-dimensional image from a hologram according to the present embodiment are provided in a remote location, it is possible to form a hologram using the hologram forming apparatus by transmitting three-dimensional image information to the remote location using the internet or the like and to reproduce a three-dimensional image from the hologram thus formed. It is therefore possible to form holograms having three-dimensional image information with the same quality and to reproduce three-dimensional images with the same quality in any place.

According to the present embodiment, beams of recording light are calculated based on three-dimensional image information, e.g., three-dimensional image data to be processed by a computer. As a result, a hologram can be easily corrected by correcting the three-dimensional image data. Therefore, when a final hologram is to be formed with appropriate corrections added thereto, the embodiment makes it possible to form the final hologram more easily with a reduced cost compared to methods wherein a hologram is formed by causing interference between object light from an existing object and reference light. Further, a hologram can be formed based on three-dimensional image information even for an object which does not exist or which is too large, and an image can be easily formed with characters representing a title or the like or various visual effects added thereon, which makes it possible to create advertisements and magazine front pages that give stronger impression.

According to the present embodiment, since a hologram in the form of a thin sheet can be formed, it is possible to form a hologram which has high portability like conventional OHP sheets and which can be filed similarly to a sheet of paper. Further, a presentation can be carried out using three-dimensional images with ease of operation similar to that of a conventional OHP and OHP sheets by forming sheet-like holograms and using a simple reproducing apparatus having a configuration similar to that of an OHP as shown in FIG. 15. According to the present embodiment, a thick recording medium can be used to form a hologram for reproducing a three-dimensional image therein.

According to the present embodiment, the recording medium 1 to allow recording of a three-dimensional interference pattern is used, and a three-dimensional interference pattern is recorded in the recording medium 1. It is therefore possible to perform multiplex recording of a plurality of three-dimensional interference patterns in the recording medium 1 by combining beams of reference light and object light on an assumption that there are a plurality of beams of reference light incident at different angles as reference light for reproduction and that there are beams of object light from different three-dimensional images originating from the respective beams of the reference light. This makes it possible to form a hologram that allows reproduction of different three-dimensional images depending on the incident angle of the reference light for reproduction. For example, a hologram may be formed on an assumption that there is a plurality of parallel beams at different angles of incidence as reference light for reproduction, and three-dimensional images may be reproduced from the hologram using sun beams as reference light for reproduction, which makes it possible to form a hologram that allows reproduction of different three-dimensional images depending on the time zones of a day.

Figure 17:
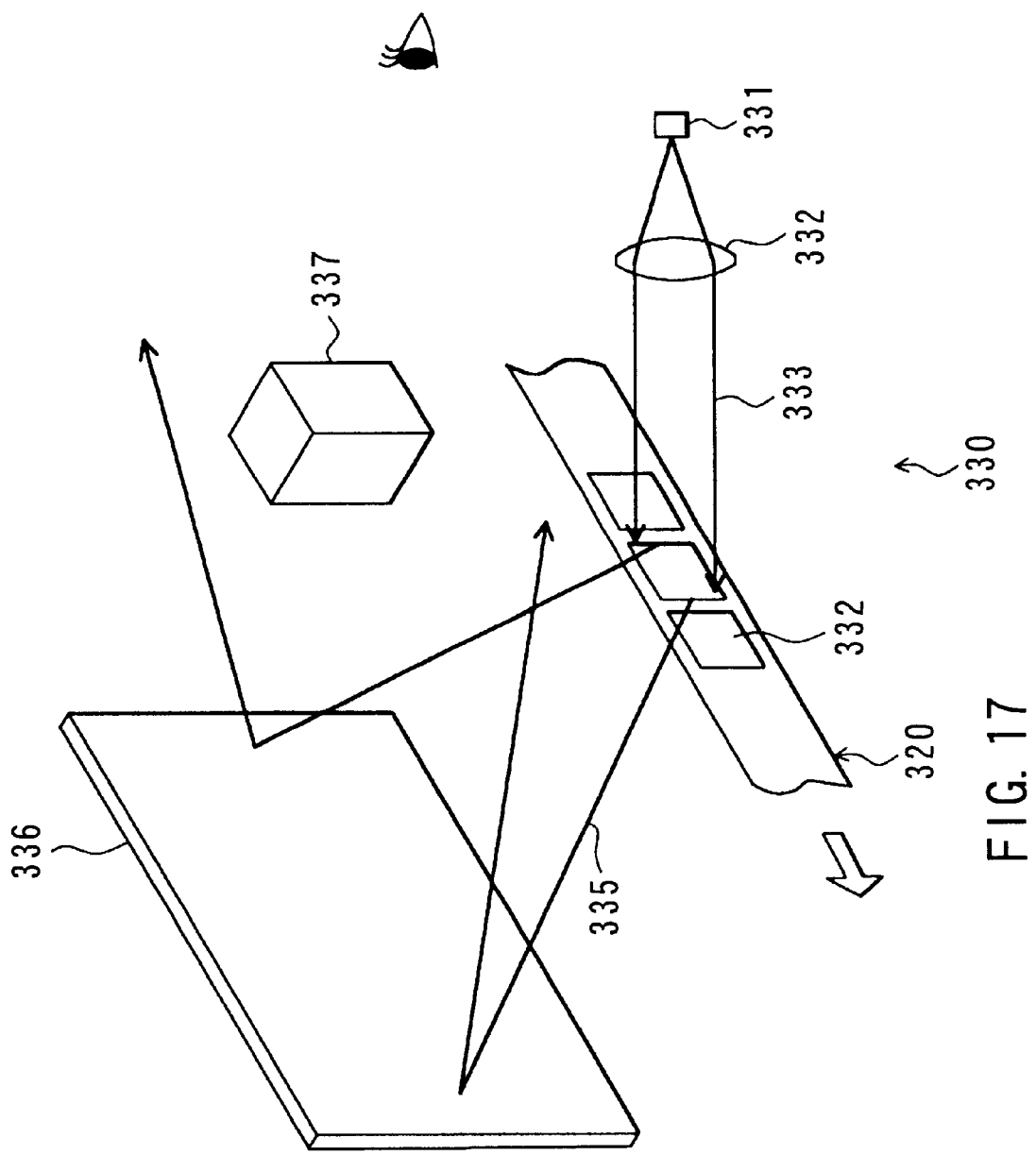
FIG. 17 is an illustration of an example of the reproducing apparatus for reproducing a three-dimensional image from a hologram shown in FIG. 16.

According to the present embodiment, it is also possible to reproduce a moving three-dimensional image by forming a hologram in a configuration similar to that of a movie film as shown in FIG. 16 and by using a reproducing apparatus having a configuration like that of a projector as shown in FIG. 17.

While the spatial light modulator 24 of the present embodiment is provided between the dichroic prism 23R and reflecting prism 25 shown in FIG. 1, the spatial light modulator 24 may alternatively be provided between the beam splitter 37 and S-polarized hologram 35 in the head 10 or on the side of the incident surface of the beam splitter 37. Alternatively, instead of providing a spatial light modulator 24 shared by R, G and B colors, spatial light modulators to be respectively and exclusively used for R, G and B images may be provided between the collimator lens 22R and dichroic prism 23R, between the collimator lens 22G and dichroic prism 23G and between the collimator lens 22B and reflecting prism 23B, respectively.

Figure 18:
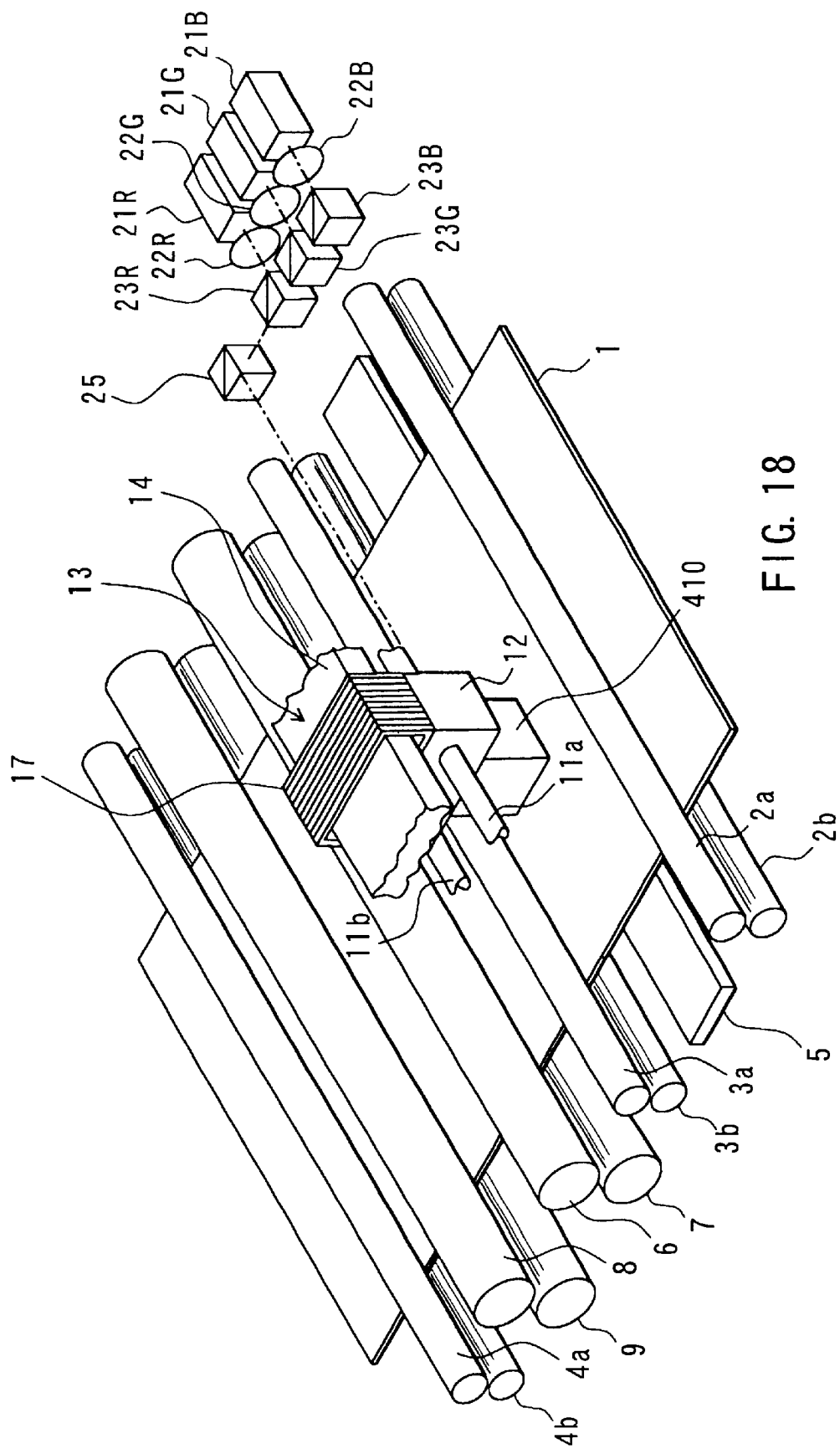
FIG. 18 is a perspective view of a configuration of a hologram forming apparatus according to a second embodiment of the invention.

A description will now be made on an apparatus and a method for forming a hologram according to a second embodiment of the invention. FIG. 18 is a perspective view of a configuration of a hologram forming apparatus according to present embodiment. As shown in FIG. 18, the hologram forming apparatus of the present embodiment does not have the spatial light modulator 24 as provided in the first embodiment. Further, there is provided a head 410 in place of the head 10 of the first embodiment.

Figure 19:
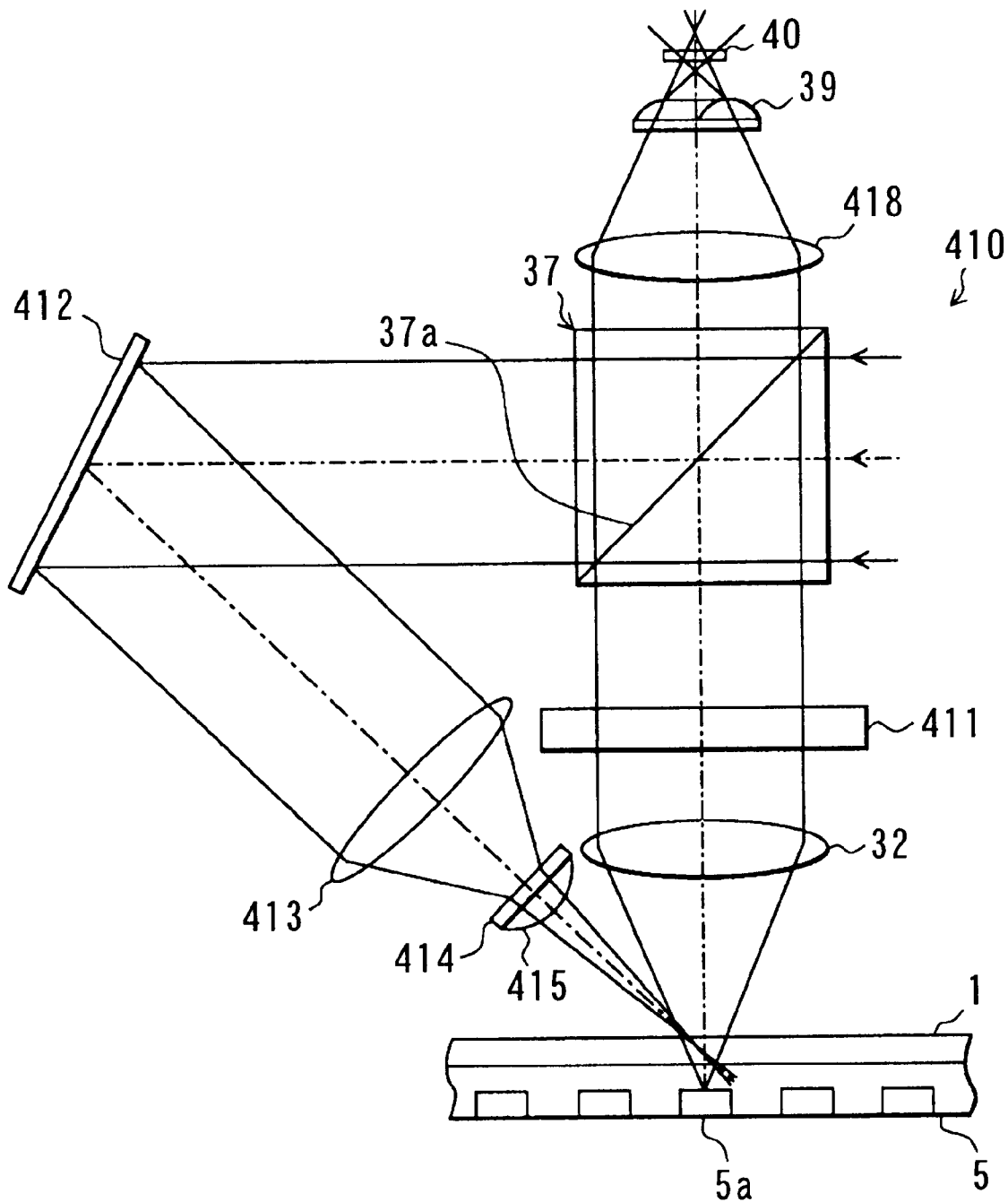
FIG. 19 is an illustration of a configuration of the head in FIG. 18.

FIG. 19 is an illustration of a configuration of the head of the present embodiment. The head 410 of the present embodiment has: an objective lens 32 provided opposite to a recording medium 1; an actuator (not shown) capable of moving the objective lens 32 in the direction of the thickness of the recording medium 1 and a transporting direction of the recording medium 1; and a spatial light modulator 411, a beam splitter 37, a convex lens 418, a cylindrical lens 39 and a quadruple photodetector 40 which are disposed on the side of the objective lens 32 opposite to the recording medium 1 in the order listed that is the order of their closeness to the objective lens 32.

The head 410 further has: a mirror 412 disposed in the traveling direction of light that is incident from the reflecting prism 25 in FIG. 18 and transmitted by a half-reflecting surface 37a of the beam splitter 37; and a convex lens 413, a concave lens 414 and a cylindrical lens 415 which are disposed in the traveling direction of light reflected by the mirror 412 in the order listed that is the order of their closeness to the mirror 412. Light emitted by the cylindrical lens 415 impinges upon the recording medium 1 such that the center (optical axis) thereof is at an angle of 45° to the surface of the recording medium 1 and crosses light from the objective lens 32 in the recording medium 1. Light emitted by the cylindrical lens 415 is narrowed to a minimum thickness in the recording medium 1.

The spatial light modulator 411 in the present embodiment has a great number of pixels arranged in the form of a grid and is capable of spatially modulating light on the basis of light intensity by selecting a light transmitting state or blocking state for each of the pixels. The spatial light modulator 411 is driven by the controller 65 shown in FIG. 6.

In the head 410 of the present embodiment, light incident upon the head 410 impinges upon the beam splitter 37 sideways; a part of the quantity of light is reflected by the half-reflecting surface 37a; and a part of the quantity of light is transmitted by the half-reflecting surface 37a. The light reflected by the half-reflecting surface 37a impinges upon the spatial light modulator 411 which spatially modulates the light. In the present embodiment, this light serves as information light for recording. The information light for recording is collected by the objective lens 32 to impinge upon the recording medium 1, and the light convergingly passes through the recording medium 1 and converges to a minimum diameter at the further side of the recording medium Light which has impinged upon the beam splitter 37 sideways and has passed through the half-reflecting surface 37a is reflected by the mirror 412 to pass through the convex lens 413 and concave lens 414 sequentially. The diameter of the beam of light is thus reduced, and it is converged by the cylindrical lens 415 only in the direction of the optical axis of the objective lens 32 into a beam of light having a flat configuration which impinges upon the recording medium 1. In the present embodiment, this light serves as reference light for recording. The reference light for recording crosses the information light for recording from the objective lens 32 inside the recording medium 1.

A three-dimensional interference pattern is recorded in the recording medium 1 as a result of interference between the information light for recording and the reference light for recording. In the present embodiment, the interference pattern serves as a partial interference pattern to form a partial hologram. The partial hologram has a configuration in the form of a circular plate. Partial holograms are sequentially formed by moving the head 410 similarly to the first embodiment.

Figure 20:
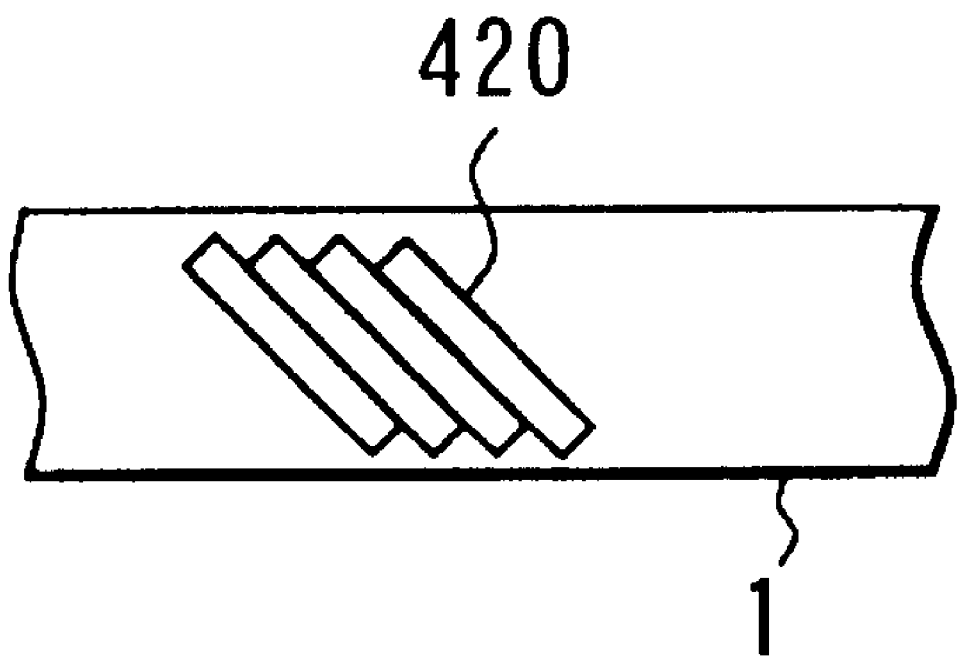
FIG. 20 is an illustration of a state of partial holograms formed in a recording medium using the hologram forming apparatus according to the second embodiment of the invention.

FIG. 20 illustrates a state of partial holograms 420 formed in the recording medium 1 in such a manner. As illustrated in FIG. 20, according to the present embodiment, a plurality of partial holograms 420 in the form of layers are formed on one another in the recording medium 1.

In the present embodiment, the controller 65 calculates the reference light for recording and the information light for recording on an assumption that there are partial interference patterns in the partial holograms in the form of layers.

In the present embodiment, the information light for recording is turned into return light which has been reflected by the lower end of the guide portion 5 and modulated by the embossed pits 5a. The return light is collimated by the objective lens 32 to pass through the spatial light modulator 411, and is thereafter incident upon the beam splitter 37. A part of the quantity of light is transmitted by the half-reflecting surface 37a and passes through the convex lens 418 and cylindrical lens 39 to impinge upon the quadruple photodetector 40. Based on the output of the quadruple photodetector 40, the detection circuit 61 detects a focus error signal FE, a tracking error signal TE and a reproduction signal RF.

The configuration, operation and effects of the present embodiment are otherwise the same as those of the first embodiment.

Figure 21:
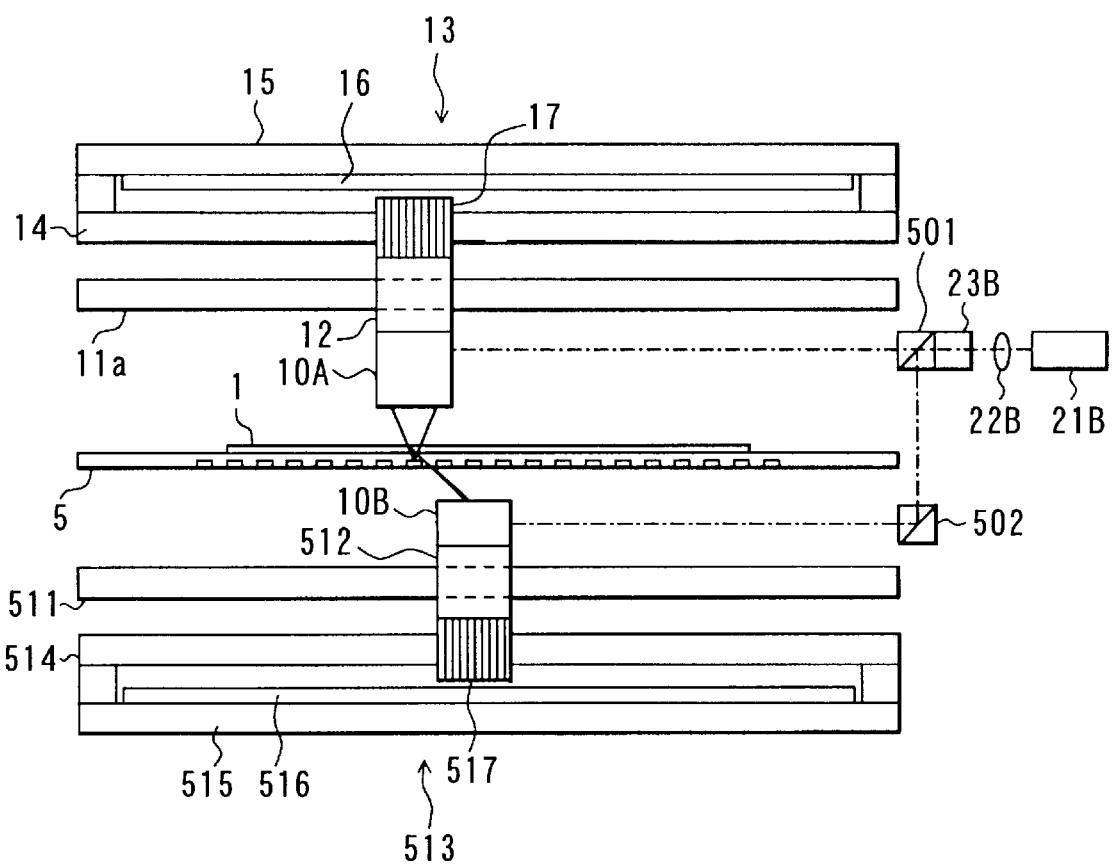
FIG. 21 is a side view of a hologram forming apparatus according to a third embodiment of the invention.

An apparatus and a method for forming a hologram according to a third embodiment of the invention will now be described. FIG. 21 is a side view of the hologram forming apparatus according to the present embodiment. This hologram forming apparatus is provided with an upper head portion 10A in place of the head 10 of the first embodiment.

The hologram forming apparatus further has: a lower head portion 10B provided under the guide portion 5; two guide shafts 511 provided above the lower head portion 10B in parallel with the axial direction of the transport rollers 2a, 2b and 3a, 3b; and a movable portion 512 movable along the guide shafts 511 under the guidance of the guide shafts 511.

The lower head portion 10B is bonded to an upper end face of the movable portion 512 to be moved with the movable portion 512.

Further, the hologram forming apparatus has a VCM 513 for moving the movable portion 512 along the guide shafts 511. The VCM 513 has a configuration similar to that of the VCM 13. Specifically, the VCM 513 has: a VCM yoke 514 provided under the guide shafts 511 in parallel with the guide shafts 511; a VCM yoke 515 provided under the VCM yoke 514 in parallel with the VCM yoke 514 with a predetermined interval therebetween and coupled to the VCM yoke 514 at the ends thereof: a plate-like VCM magnet 516 secured to the top surface of the VCM yoke 515; and a voice coil 517 provided around the VCM yoke 514 at a predetermined interval from the outer circumferential surface of the VCM yoke 514. The voice coil 517 is bonded to a lower end face of the movable portion 512. The VCM 513 having such a configuration moves the lower head portion 10B in parallel with the guide shafts 511.

In the present embodiment, the upper head portion 10A and the lower head portion 10B correspond to the head according to the invention, and the VCM 13 and the VCM 513 correspond to the position change means according to the invention.

The hologram forming apparatus further has: a beam splitter 501 upon which light from the reflecting prism 25 in FIG. 1 impinges, which transmits a part of the quantity of light to cause it to impinge upon the upper head portion 10A and which reflects a part of the quantity of light downward; and a reflecting prism 502 for reflecting the light reflected by the beam splitter 501 to cause it to impinge upon the lower head portion 10B.

Figure 22:
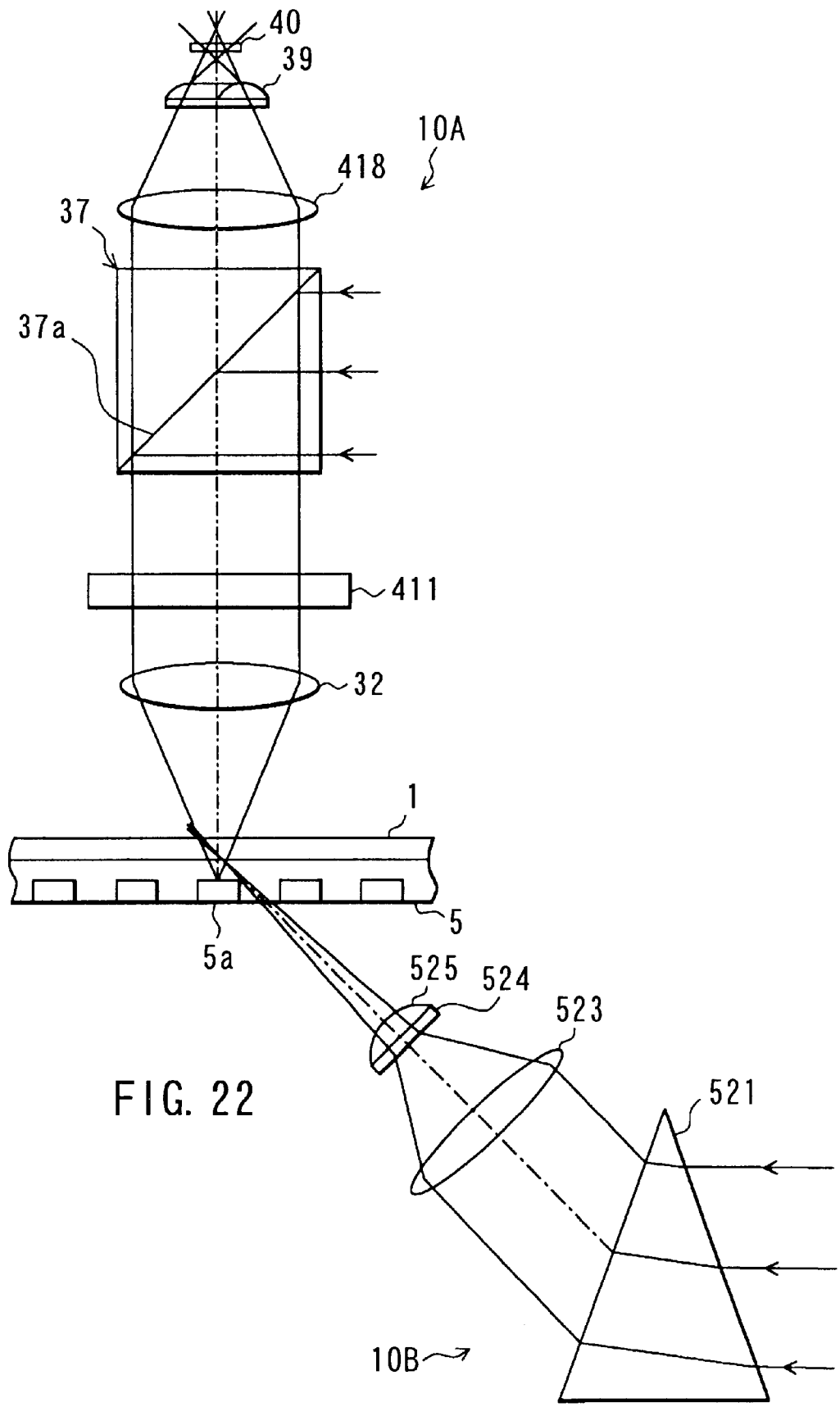
FIG. 22 is an illustration of a configuration of the head in FIG. 21.

FIG. 22 is an illustration of a configuration of the upper head portion 10A and the lower head portion 10B. The upper head portion 10A has a configuration obtained by deleting the mirror 412, convex lens 413, concave lens 414 and cylindrical lens 415 from the head 410 shown in FIG. 19. The lower head portion 10B has: a prism 521 for emitting light from the reflecting prism 502 in FIG. 21 upward at a refracting angle of 45°; and a convex lens 523, a concave lens 524 and a cylindrical lens 525 which are disposed in the traveling direction of the light emitted by the prism 521 in the order listed which is the order of their closeness to the prism 521. Light emitted by the cylindrical lens 525 impinges upon the recording medium 1 from below such that the center (optical axis) thereof is at an angle of 45° to the surface of the recording medium 1 and crosses light from the objective lens 32 in the recording medium 1. Light emitted by the cylindrical lens 525 is narrowed to a minimum thickness in the recording medium 1.

In the present embodiment, the VCM 13 and the VCM 513 cooperate under the control of the controller 65 shown in FIG. 6 to establish a constant relative positional relationship between the light from the objective lens 32 and the light from the cylindrical lens 525.

In the present embodiment, light incident upon the upper head portion 10A impinges upon the beam splitter 37 sideways, and a part of the quantity of light is reflected by the half-reflecting surface 37a. The light reflected by the half-reflecting surface 37a impinges upon the spatial light modulator 411 to be spatially modulated by the spatial light modulator 411. In the present embodiment, this light serves as information light for recording. The information light for recording is collected by the objective lens 32 to be projected upon the recording medium 1, and the light convergingly passes through the recording medium 1 and converges to a minimum diameter at the further side of the recording medium 1.

In the present embodiment, light incident upon the lower head portion 10B is refracted by the prism 521 and passes through the convex lens 523 and concave lens 524 sequentially to reduce the diameter of the beam of light. The light is converged by the cylindrical lens 525 only in the direction of the optical axis of the objective lens 32 into a beam of light having a flat configuration which in turn impinges upon the recording medium 1. In the present embodiment, this light serves as reference light for recording. The reference light for recording crosses the information light for recording from the objective lens 32 inside the recording medium 1.

A three-dimensional partial interference pattern is recorded in the recording medium 1 as a result of interference between the information light for recording and the reference light for recording to form a partial hologram. The partial hologram has a configuration in the form of a circular plate similar to that in the second embodiment. In the present embodiment, however, the partial hologram is a reflection type (Lippmann type) hologram. Partial holograms are sequentially formed by moving the upper head portion 10A and the lower head portion 10B to form a complete hologram. The hologram is a reflection type hologram.

The present embodiment thus makes it possible to form a reflection type hologram. In the case of such a reflection type hologram, when the hologram is illuminated with reference light for reproduction, reproduction light is produced on the same side thereof as that illuminated with the reference light, and a viewer can view a three-dimensional image reproduced by the reproduction light.

The configuration, operations and effects of the present embodiment are otherwise the same as those of the second embodiment.

The present invention is not limited to the above-described embodiments. For example, while focus servo and tracking servo are performed in the above embodiments, it may be sufficient to perform focus servo only, for example, when the head is moved with only a slight run-out.

While the above-described embodiments have referred to cases wherein reference light for reproduction and reference light for recording are different from each other, the same light may be used as reference light for reproduction and reference light for recording as a special case. In this case, object light assumed in association with a three-dimensional image to be displayed may be used as it is as information light for recording, which facilitates calculations of reference light for recording and information light for recording.

As described above, with the apparatus or method for forming a hologram according to the invention, a hologram is formed by performing a plurality of times the. operation of illuminating a part of a recording medium on which information is recorded utilizing holography with a plurality of beams of recording light that forms a part of an interference pattern for generating reproduction light associated with a desired three-dimensional image when illuminated with reference light for reproduction to thereby record the part of the interference pattern while changing the relative positional relationship between the recording medium and the beams of recording light. It is therefore possible to form a hologram for reproducing a three-dimensional image easily free from limitations placed by the size of the three-dimensional image to be reproduced, the size of the hologram and reference light for reproduction.

The apparatus or method for forming a hologram according to the invention is advantageous in that a three-dimensional hologram can be formed by providing a recording medium that allows recording of a three-dimensional interference pattern and by forming a three-dimensional interference pattern.

The apparatus or method for forming a hologram according to the invention is advantageous in that it is possible to correct the hologram easily by correcting information of a three-dimensional image, which is achieved by spatially modulating at least one of a plurality of beams of recording light in a modulation pattern calculated based on the information of the three-dimensional image.

The apparatus or method for forming a hologram according to the invention is advantageous in that a hologram is formed with a simple mechanism by forming the recording medium in the form of a sheet and by illuminating the recording medium with a plurality of beams of recording light on the same side thereof.

In addition, the apparatus or method for forming a hologram according to the invention is advantageous in that an optical system for illumination with beams of recording light can be made compact by radiating a plurality of beams of recording light such that the optical axes of the respective beams of recording light are located on the same line.

The apparatus or method for forming a hologram according to the invention is advantageous in that a hologram is formed with improved accuracy by controlling the positions of a plurality of beams of recording light on the recording medium.

The apparatus or method for forming a hologram according to the invention is advantageous in that a hologram is formed with improved stability by providing fixing means for fixing an interference pattern recorded in the recording medium.

It is apparent from the above description that the invention can be carried out in various modes or modified modes. It is therefore possible to carry out the invention in modes other than the above-described best modes for carrying out the invention within the scope of equivalence of the appended claims.

What is claimed is:

1. A hologram forming apparatus for forming a hologram for reproducing a three-dimensional image by recording an interference pattern for generating reproduction light associated with a desired three-dimensional image when illuminated with reference light for reproduction in a recording medium in which information is recorded utilizing holography, comprising:

a head for illuminating a part of the recording medium with a plurality of beams of recording light for forming a part of the interference pattern to record the part of the interference pattern;

position change means for changing the relative positional relationship between the head and the recording medium;

position control means for controlling the positions of the plurality of beams of recording light relative to the recording medium based on return light from the recording medium generated when the recording medium is illuminated with the beams of recording light; and a controller for controlling the head and the position control means so that an operation of recording the part of the interference pattern on the part of the recording medium is performed a plurality of times while changing the relative positional relationship between the head and the recording medium, thereby forming a hologram.

2. A hologram forming apparatus according to claim 1, wherein the recording medium allows recording of a three-dimensional interference pattern and the interference pattern is a three-dimensional interference pattern.

3. A hologram forming apparatus according to claim 1, wherein at least one of the plurality of beams of recording light is spatially modulated in a modulation pattern calculated based on information of a three-dimensional image.

4. A hologram forming apparatus according to claim 1, wherein the recording medium is formed in a sheet-like configuration and the head illuminates the recording medium with the plurality of beams of recording light on the same side thereof.

5. A hologram forming apparatus according to claim 4, wherein the head radiates the plurality of beams of recording light such that the optical axes of the respective beams of recording light are located on the same line.

6. A hologram forming apparatus according to claim 1, further comprising fixing means for fixing the interference pattern recorded in the recording medium.

7. A method for forming a hologram for reproducing a three-dimensional image by recording an interference pattern for generating reproduction light associated with a desired three-dimensional image when illuminated with reference light for reproduction in a recording medium in which information is recorded utilizing holography, comprising the steps of:

performing an operation of illuminating a part of the recording medium with a plurality of beams of recording light for forming a part of the interference pattern to record the part of the interference pattern a plurality of times while changing the relative positional relationship between the recording medium and the beams of recording light, thereby forming a hologram; and controlling the positions of the plurality of beams of recording light relative to the recording medium based on return light from the recording medium generated when the recording medium is illuminated with the beams of recording light.

8. A method for forming a hologram according to claim 7, wherein the recording medium allows recording of a three-dimensional interference pattern and the interference pattern is a three-dimensional interference pattern.

9. A method for forming a hologram according to claim 7, wherein at least one of the plurality of beams of recording light is spatially modulated in a modulation pattern calculated based on information of a three-dimensional image.

10. A method for forming a hologram according to claim 7, wherein the recording medium is formed in a sheet-like configuration and the recording medium is illuminated with the plurality of beams of recording light on the same side thereof.

11. A method for forming a hologram according to claim 10, wherein the plurality of beams of recording light is radiated such that the optical axes of the respective beams of recording light are located on the same line.

12. A method for forming a hologram according to claim 7, further comprising the step of fixing the interference pattern recorded in the recording medium.

13. A hologram forming apparatus according to claim 1, further comprising a guide portion provided under the recording medium, the guide portion having a portion for modulating the return light.

14. A hologram forming apparatus according to claim 1, wherein the position control means performs focus servo and tracking servo.

15. A method for forming a hologram according to claim 7, wherein the positions of the beams of recording light are controlled based on return light modulated by a guide portion provided under the recording medium having a portion for modulating the return light.

16. A method for forming a hologram according to claim 7, wherein the positions of the beams of recording light are controlled by performing focus servo and tracking servo.

* * * * *